United States Patent
Giffard-Burley et al.

(10) Patent No.: US 12,430,390 B2
(45) Date of Patent: *Sep. 30, 2025

(54) SECURE SIGNING METHOD, DEVICE AND SYSTEM

(71) Applicant: Wacom Co., Ltd., Saitama (JP)

(72) Inventors: Joss Daniel Giffard-Burley, Frome (GB); Avinav Khanal, Duesseldorf (DE); Novi Rahman, Duesseldorf (DE)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,563

(22) Filed: Apr. 1, 2024

(65) Prior Publication Data

US 2024/0273146 A1    Aug. 15, 2024

Related U.S. Application Data

(63) Continuation of application No. 17/485,025, filed on Sep. 24, 2021, now Pat. No. 11,971,929.

(51) Int. Cl.
*G06F 16/907*   (2019.01)
*G06F 16/93*    (2019.01)
(Continued)

(52) U.S. Cl.
CPC ............ *G06F 16/907* (2019.01); *G06F 16/93* (2019.01); *G06K 7/1408* (2013.01); *G06V 40/30* (2022.01)

(58) Field of Classification Search
None
See application file for complete search history.

(56) References Cited

U.S. PATENT DOCUMENTS 8,140,786 B2   3/2012   Bunte et al.
9,855,785 B1   1/2018   Nagelberg et al.
(Continued)

OTHER PUBLICATIONS

Saqib Rasool; Docschain: Blockchain-Based IoT Solution for Verification of Degree Documents; IEEE; vol. 7 No. 3, Jun. 2020; pp. 827-837.*

(Continued)

*Primary Examiner* — Ann J Lo
*Assistant Examiner* — Jermaine A Mincey
(74) *Attorney, Agent, or Firm* — Seed Intellectual Property Law Group LLP

(57) ABSTRACT

A record including an original document and a modification to the original document is created. Metadata associated with the modification to the original document is generated. The modification in stored in a data store. Creation and registration of a decentralized identifier (DID) document for the modification is requested based on the generated metadata. Modified document metadata is generated which includes a document hash and the created DID document for the modification. Recordation of the modification in a blockchain transaction, creation and registration of a DID document for the modified document, and generation of verifiable credentials for the modification are requested. The generated verifiable credentials for the modification are stored and a quick response (QR) code for the DID document for the modification is generated. A visual representation of the modification and the QR code for the modification are added to the original document, generating a sealed document.

16 Claims, 20 Drawing Sheets

(51) Int. Cl.
*G06K 7/14* (2006.01)
*G06V 40/30* (2022.01)

(56) References Cited

U.S. PATENT DOCUMENTS

| | | | |
|---|---|---|---|
| 2019/0130042 A1* | 5/2019 | Gabriel | G06Q 20/10 |
| 2019/0139037 A1 | 5/2019 | Khalil et al. | |
| 2020/0145223 A1* | 5/2020 | Yang | H04L 63/08 |
| 2020/0211409 A1 | 7/2020 | Latorre et al. | |
| 2021/0111867 A1 | 4/2021 | Lin et al. | |
| 2021/0117966 A1* | 4/2021 | Lu | G06Q 20/3829 |
| 2021/0273931 A1* | 9/2021 | Murdoch | H04L 9/3239 |
| 2021/0287770 A1* | 9/2021 | Anderson | G16H 40/20 |

OTHER PUBLICATIONS

Mikula et al., "Identity and Access Management with Blockchain in Electronic Healthcare Records," 21$^{st}$ Euromicro Conference on Digital System Design, 2018, 8 pages.

Tariq et al., "Securing Broker-Less Publish/Subscribe Systems Using Identity-Based Encryption," IEEE Transactions on Parallel and Distributed Systems, 25(2), Feb. 2014, 11 pages.

\* cited by examiner

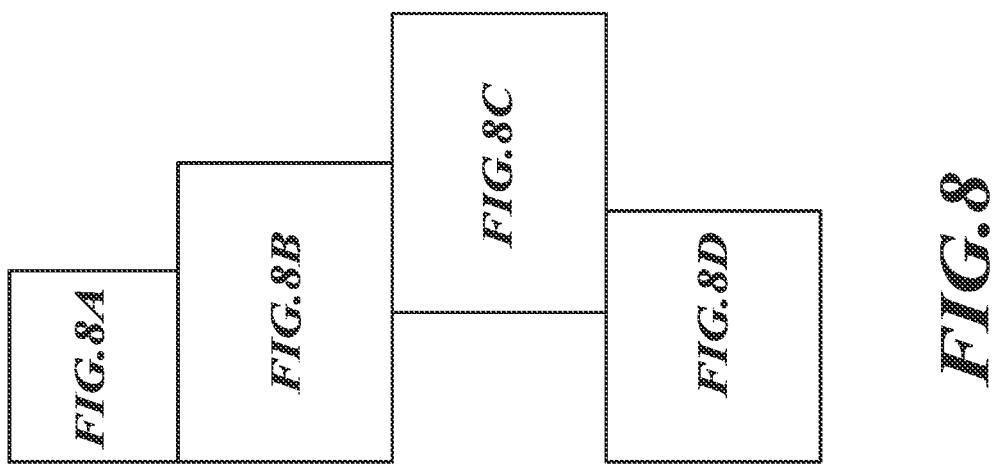

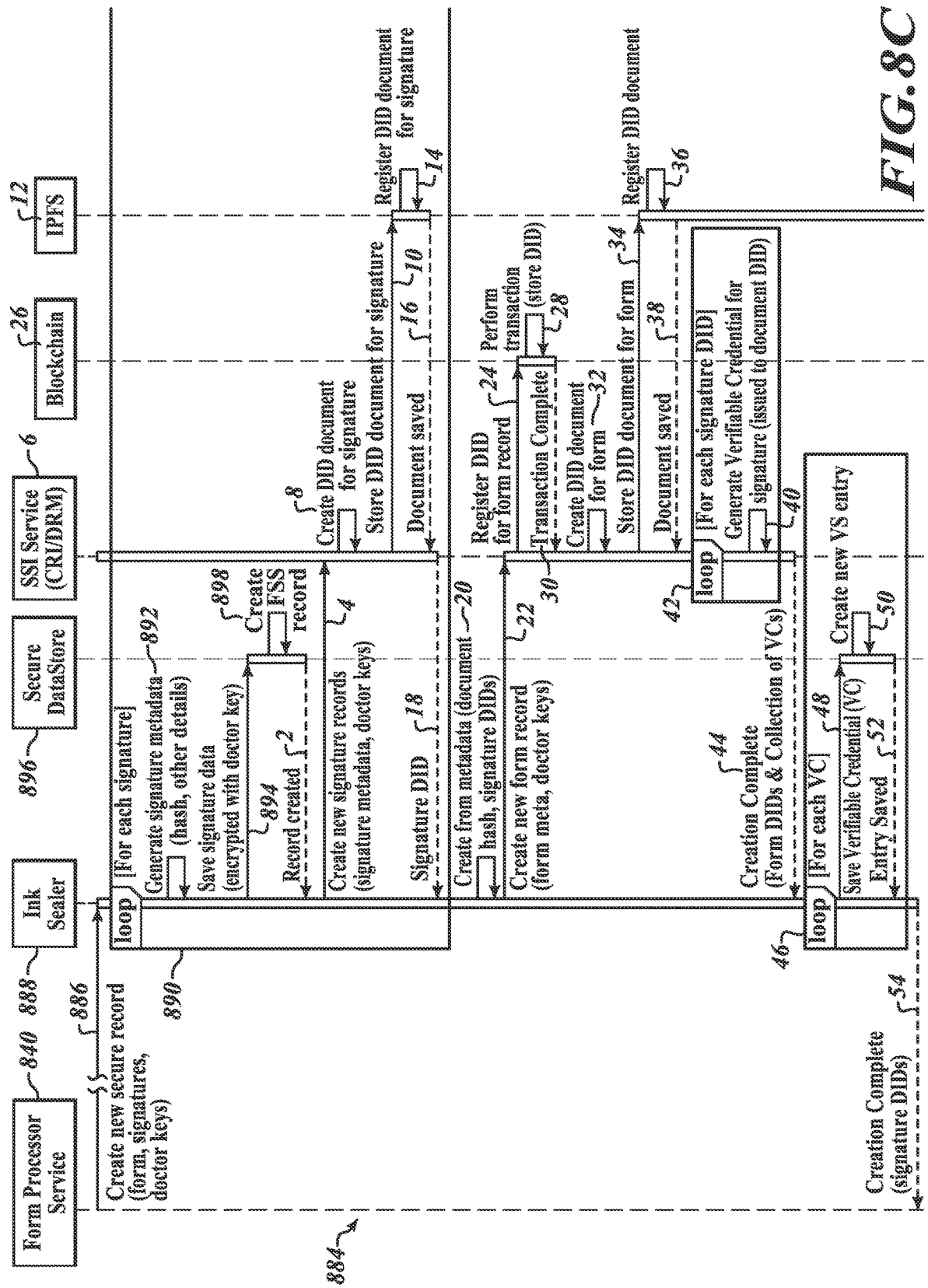

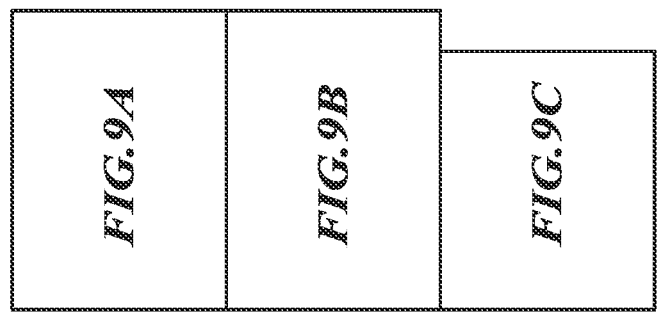

SECURE SIGNING METHOD, DEVICE AND SYSTEM

BACKGROUND

Technical Field

The present disclosure generally relates to methods of document signing workflows, and to related systems, devices and articles.

Description of the Related Art

Document workflow management systems allow users to maintain and perform various tasks involving documents. For example, a document management system may store documents in a relational database, facilitating shared access to the documents by multiple users. Document workflow management systems also may facilitate execution of documents, for example, by allowing documents to be signed on electronic devices and validating signatures applied to original electronic documents.

BRIEF SUMMARY

In an embodiment, a device comprises a memory and processing circuitry coupled to the memory, which, in operation, generate a sealed document. The processing circuitry, in operation, creates a record including an original document and a modification to the original document, generates metadata associated with the modification to the original document, stores the modification in a data store, requests creation and registration of a decentralized identifier (DID) document for the modification based on the generated metadata, generates modified document metadata including a document hash and the created DID document for the modification, requests recordation of the modification in a blockchain transaction, creation and registration of a DID document for the modified document, and generation of verifiable credentials for the modification, stores the generated verifiable credentials for the modification, generates a quick response (QR) code for the DID document for the modification, and adds a visual representation of the modification and the QR code for the modification to the original document, generating the sealed document.

In an embodiment, a method is employed to generate a sealed document. The method includes creating a record including an original document and a modification to the original document. Metadata associated with the modification to the original document is generated. The modification is stored in a data store. Creation and registration is requested of a decentralized identifier (DID) document for the modification based on the generated metadata. Modified document metadata is generated and includes a document hash and the created DID document for the modification. Recordation of the modification in a blockchain transaction, creation and registration of a DID document for the modified document, and generation of verifiable credentials for the modification are requested. The generated verifiable credentials for the modification are stored. A quick response (QR) code for the DID document for the modification is generated. A visual representation of the modification and the QR code for the modification are added to the original document, generating a sealed document.

In an embodiment, a system comprises a signature capture device, which, in operation, captures digital signatures, and processing circuitry coupled to the signature capture device. The processing circuitry, in operation, creates a record including an original document and a modification to the original document, generates metadata associated with the modification to the original document, stores the modification in a data store, requests creation and registration of a decentralized identifier (DID) document for the modification based on the generated metadata, generates modified document metadata including a document hash and the created DID document for the modification, requests recordation of the modification in a blockchain transaction, creation and registration of a DID document for the modified document, and generation of verifiable credentials for the modification, stores the generated verifiable credentials for the modification, generates a quick response (QR) code for the DID document for the modification, and adds a visual representation of the modification and the QR code for the modification to the original document, generating a sealed document. In an embodiment, the modification includes application of a digital signature captured by the signature capture device to the original document.

In an embodiment, a non-transitory computer-readable medium's contents configure a processing system to implement a method. The method includes creating a record including an original document and a modification to the original document, generating metadata associated with the modification to the original document, storing the modification in a data store, requesting creation and registration of a decentralized identifier (DID) document for the modification based on the generated metadata, generating modified document metadata including a document hash and the created DID document for the modification, requesting recordation of the modification in a blockchain transaction, creation and registration of a DID document for the document, and generation of verifiable credentials for the modification, storing the generated verifiable credentials for the modification, generating a quick response (QR) code for the DID document for the modification, and adding a visual representation of the modification and the QR code for the modification to the original document, generating a sealed document.

In an embodiment, a device comprises memory, and processing circuitry coupled to the memory. The processing circuitry, in operation, extracts quick response (QR) codes from a presented document, requests DID documents for modifications associated with the extracted QR codes, verifies digital signatures of the requested DID documents for modifications associated with the extracted QR codes, in response to successful verification of the digital signatures of the requested DID documents for modifications, requests verifiable credentials of the modifications, and cryptographically validates the requested verifiable credentials of the modifications, in response to successful validation of the requested verifiable credentials of the modifications, verifies the verifiable credentials of the modifications are associated with a common DID document, in response to successful verification the verifiable credentials of the modifications are associated with the common DID document, requests a DID document for the presented document and verifies a digital signature of the DID document for the presented document, in response to successful verification of the digital signature of the DID document for the presented document, requests verifiable credentials of the presented document and cryptographically validates the verifiable credentials of the presented document, in response to successful validation of the verifiable credentials of the presented document, retrieves a document based on a resource locator extracted from the verifiable credentials of the presented document and compares a hash of the retrieved document with a hash extracted from the verifiable credentials of the presented document, and in response to the comparing indicating the hash of the retrieved document matches the hash extracted from the verifiable credentials, authenticates the presented document.

In an embodiment, a method comprises extracting quick response (QR) codes from a presented document, requesting DID documents for modifications associated with the extracted QR codes, verifying digital signatures of the requested DID documents for modifications associated with the extracted QR codes, in response to successful verification of the digital signatures of the requested DID documents for modifications, requesting verifiable credentials of the modifications, and cryptographically validating the requested verifiable credentials of the modifications, in response to successful validation of the requested verifiable credentials of the modifications, verifying the verifiable credentials of the modifications are associated with a common DID document, in response to successful verification the verifiable credentials of the modifications are associated with the common DID document, requesting a DID document for the presented document and verifying a digital signature of the DID document for the presented document, in response to successful verification of the digital signature of the DID document for the presented document, requesting verifiable credentials of the presented document and cryptographically validating the verifiable credentials of the presented document, in response to successful validation of the verifiable credentials of the presented document, retrieving a document based on a resource locator extracted from the verifiable credentials of the presented document and comparing a hash of the retrieved document with a hash extracted from the verifiable credentials of the presented document, and in response to the comparing indicating the hash of the retrieved document matches the hash extracted from the verifiable credentials, authenticating the presented document.

In an embodiment, a system comprises a document scanner, which, in operation, scans documents, and processing circuitry coupled to the document scanner. The processing circuitry, in operation, extracts quick response (QR) codes from a scanned document, requests DID documents for modifications associated with the extracted QR codes, verifies digital signatures of the requested DID documents for modifications associated with the extracted QR codes, in response to successful verification of the digital signatures of the requested DID documents for modifications, requests verifiable credentials of the modifications, and cryptographically validates the requested verifiable credentials of the modifications, in response to successful validation of the requested verifiable credentials of the modifications, verifies the verifiable credentials of the modifications are associated with a common DID document, in response to successful verification the verifiable credentials of the modifications are associated with the common DID document, requests a DID document for the presented document and verifies a digital signature of the DID document for the presented document, in response to successful verification of the digital signature of the DID document for the presented document, requests verifiable credentials of the presented document and cryptographically validates the verifiable credentials of the presented document, in response to successful validation of the verifiable credentials of the presented document, retrieves a document based on a resource locator extracted from the verifiable credentials of the presented document and compares a hash of the retrieved document with a hash extracted from the verifiable credentials of the presented document, and in response to the comparing indicating the hash of the retrieved document matches the hash extracted from the verifiable credentials, authenticating the scanned document.

In an embodiment, a non-transitory computer-readable medium's contents configure a computing system to perform a method. The method includes extracting quick response (QR) codes from a presented document, requesting DID documents for modifications associated with the extracted QR codes, verifying digital signatures of the requested DID documents for modifications associated with the extracted QR codes, in response to successful verification of the digital signatures of the requested DID documents for modifications, requesting verifiable credentials of the modifications, and cryptographically validating the requested verifiable credentials of the modifications, in response to successful validation of the requested verifiable credentials of the modifications, verifying the verifiable credentials of the modifications are associated with a common DID document, in response to successful verification the verifiable credentials of the modifications are associated with the common DID document, requesting a DID document for the presented document and verifying a digital signature of the DID document for the presented document, in response to successful verification of the digital signature of the DID document for the presented document, requesting verifiable credentials of the presented document and cryptographically validating the verifiable credentials of the presented document, in response to successful validation of the verifiable credentials of the presented document, retrieving a document based on a resource locator extracted from the verifiable credentials of the presented document and comparing a hash of the retrieved document with a hash extracted from the verifiable credentials of the presented document, and in response to the comparing indicating the hash of the retrieved document matches the hash extracted from the verifiable credentials, authenticating the presented document.

In an embodiment, a device comprises memory, and processing circuitry coupled to the memory. The processing circuitry, in operation, responds to requests from a client application. In response to a request to create and record a decentralized identifier (DID) document associated with a modification to an original document, the responding includes creating a DID document for the modification, requesting registration of the DID document for the modification in a distributed file system, and providing the DID document for the modification to the client application. In response to a request to record the modification to the document, the responding includes initiating a blockchain transaction to record the modification to the document, creating a DID document for the modified document, requesting registration of the DID document for the modified document in the distributed file system, generating verifiable credentials for the DID document for the modification, and providing the verifiable credentials for the DID document for the modification to the client application.

In an embodiment, a method includes responding to a request, from a client application, to create and record a decentralized identifier (DID) document associated with a modification to an original document by: creating a DID document for the modification; requesting registration of the DID document for the modification in a distributed file system; and providing the DID document for the modification to the client application. The method includes responding to a request, from the client application, to record the modification to the document by: initiating a blockchain transaction to record the modification to the document;

creating a DID document for the modified document; requesting registration of the DID document for the modified document in the distributed file system; generating verifiable credentials for the DID document for the modification; and providing the verifiable credentials for the DID document for the modification to the client application.

In an embodiment, a system comprises a client device, which, in operation, executes client applications, and a document server, communicatively coupled to the client device. The document server, in operation, responds to a request, from a client application executing on the client device, to create and record a decentralized identifier (DID) document associated with a modification to an original document by: creating a DID document for the modification; requesting registration of the DID document for the modification in a distributed file system; and providing the DID document for the modification to the client application. The document server, in operation, responds to a request, from the client application, to record the modification to the document by: initiating a blockchain transaction to record the modification to the document; creating a DID document for the modified document; requesting registration of the DID document for the modified document in the distributed file system; generating verifiable credentials for the DID document for the modification; and providing the verifiable credentials for the DID document for the modification to the client application.

In an embodiment, a non-transitory computer-readable medium' contents configure a processing system to perform a method. The method includes responding to a request, from a client application, to create and record a decentralized identifier (DID) document associated with a modification to an original document by: creating a DID document for the modification; requesting registration of the DID document for the modification in a distributed file system; and providing the DID document for the modification to the client application. In an embodiment, the method includes responding to a request, from the client application, to record the modification to the document by: initiating a blockchain transaction to record the modification to the document; creating a DID document for the modified document; requesting registration of the DID document for the modified document in the distributed file system; generating verifiable credentials for the DID document for the modification; and providing the verifiable credentials for the DID document for the modification to the client application.

BRIEF DESCRIPTION OF THE SEVERAL VIEWS OF THE DRAWINGS

FIGS. 8 and 8A to 8D illustrate an example document workflow in the context of creating a signed treatment agreement between a doctor and a patient.

FIGS. 9 and 9A to 9C illustrate an example document workflow in the context of retrieving an original document using a quick response (QR) code, such as a QR code for a one of the signatures on a treatment plan agreement between a doctor and a patient or a QR code for the treatment form.

DETAILED DESCRIPTION

The inventors have recognized that current document workflow management techniques and systems do not provide adequate security against the copying of documents. This creates the potential for many versions of a document to exist with no clear master document. Relationships between the multiple versions of the document are not tracked, which may lead to document tampering and identity fraud. Current document signature capture workflows also are focused on the signature capture and binding process, rather than document security.

To address these issues, the inventors have developed and implemented a flexible relational web for blockchain records, which facilitates improved management of document workflows, including signature capture workflows. The improved techniques use a hybrid blockchain technology for relational authentication use purposes. The implementations facilitate content tracing and record keeping, in a scaleable and efficient manner due to a hybrid blockchain approach.

As discussed in more detail below, in an embodiment a quick response (QR) code is added to each signature on a original document. A QR code may typically be a two-dimensional barcode comprising black and white pixel patterns. All copies of the document point to that one, original file. From a self-sovereign identity (SSI) point of view, the document has a decentralized identifier (DID), and each signature also has a DID (which is encoded into the signature appearance QR code). The controller for the signature DID is set to the user DID, thus linking the signature to the user (in addition to VCs that secure this relationship). This signature QR prevents the signature appearance being successfully copied into another document, as resolving the DID for the signature would show the relationship to the original document and not the document into which the signature was copied. In an embodiment, QR codes may be assigned to individual signatures too, not just to signatures applied to a particular document.

The originality of the original document is preserved using distributed internal or external ledgers, cryptography, or various combinations thereof to establish the document's authenticity. A verified signature added to an original document may be used to retrieve the original document. The original document (when signed) may be retrieved from a print of the document, a digital copy, or a QR code. The relationships between documents, signatures within a document and signers are maintained in a cryptographically secure system. This facilitates obtaining proof of signature and originality of documents. An extended version of self-sovereign identity (SSI) workflows is employed in the document workflow management. The SSI workflow may be combined with biometric signature technologies. Embodiments may be employed in a wide variety of use cases, some examples of which are discussed in more detail herein.

Figure 1:
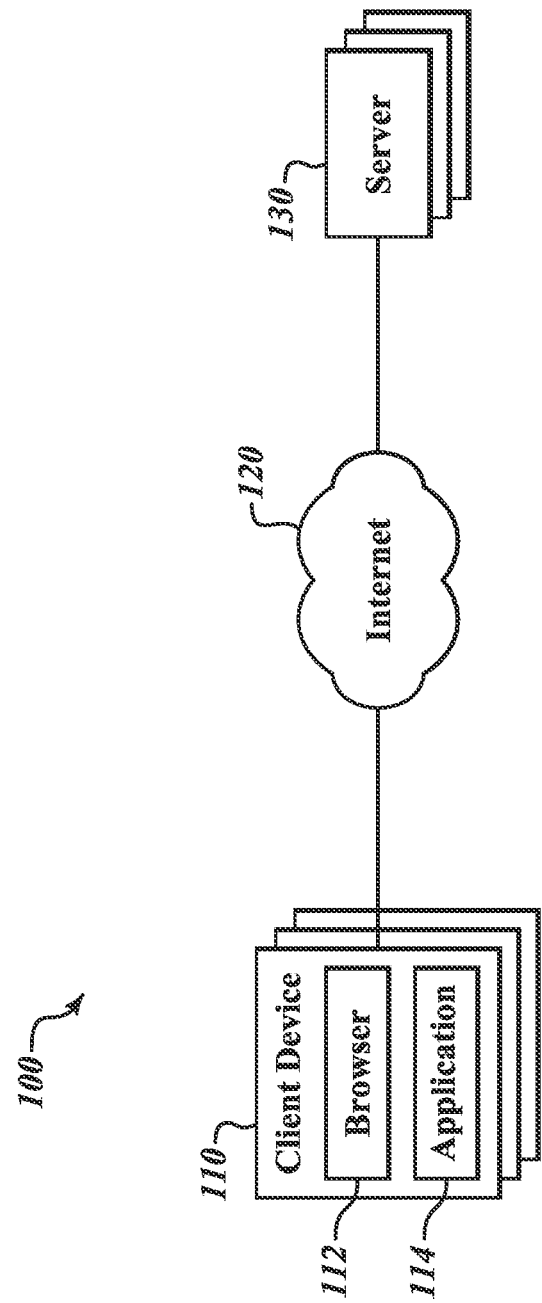
FIG. 1 is a functional block diagram of an example environment in which a document workflow management system may be employed.

FIG. 1 is a functional block diagram of an example environment 100 in which a document workflow management system may be employed. One or more client devices 110 are connected via the Internet 120 or another network to one or more servers 130 that may operate a cloud-based platform. As illustrated the one or more client devices 110 may execute a browser 112 that interacts with the cloud-based platform software on the server on behalf of a user of document management workflow system using the client device. Similarly, as illustrated, client device 110, may execute a specialized mobile application or desktop application 114 that interacts with the cloud-based platform's software on the server on behalf of a user using the client device. The client devices may be, for example, a desktop computer, a laptop, a tablet, a smart phone, a signature capture device, etc.

Figure 2:
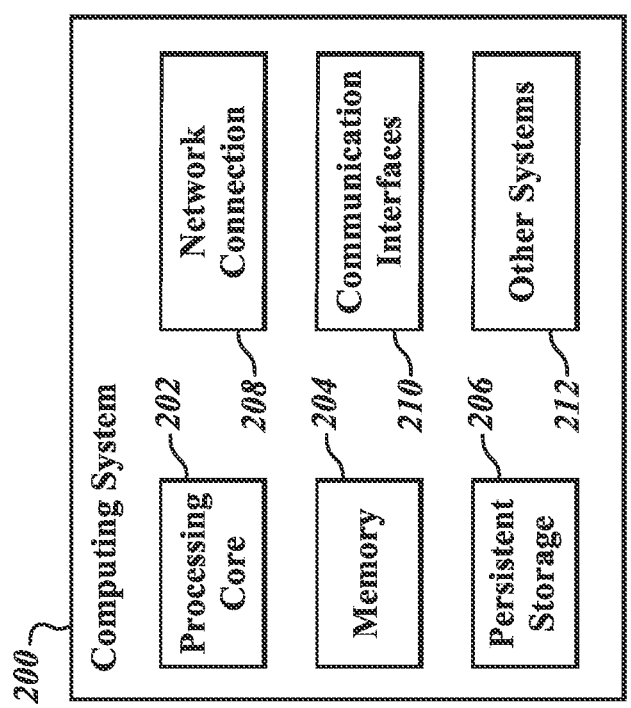
FIG. 2 is a functional block diagram of an embodiment of a computing system or other processing device that may be employed in a document workflow management system.

FIG. 2 is a functional block diagram of an embodiment of a computing system or other processing device that may be employed in a document management system, such as by the devices shown in FIG. 1. In various embodiments, these computing systems and other devices 200 can include server computer systems, cloud computing platforms or virtual machines in other configurations, desktop computer systems, laptop computer systems, netbooks, mobile phones, personal digital assistants, televisions, cameras, automobile computers, electronic media players, signature capture devices, etc. The computer systems and devices may include one or more processing cores 202 for executing computer programs such as a CPU, GPU, TPU, NNP, FPGA, or ASIC; a computer memory 204 for storing programs and data while they are being used, including the programs and associated data to implement document workflow management techniques such as the techniques disclosed herein, an operating system, device drivers, etc.; a persistent storage device 206, such as a hard drive or flash drive for persistently storing programs and data; a network connection 208 for connecting the computing system to other computer systems to send and/or receive data, such as via the Internet or another network; other communications interfaces 210 for coupling the computing system to other devices to send and or receive data, such as via various communication protocols (e.g., NFC protocols; etc); other systems 212, such as bus systems for communicatively coupling the components of the computing system 200 together, power supplies, sensors and other devices for capturing, displaying and entering data (e.g., signature capture devices, document scanners, displays, touch screens, stylus, etc.); and various combinations thereof.

Figure 3:
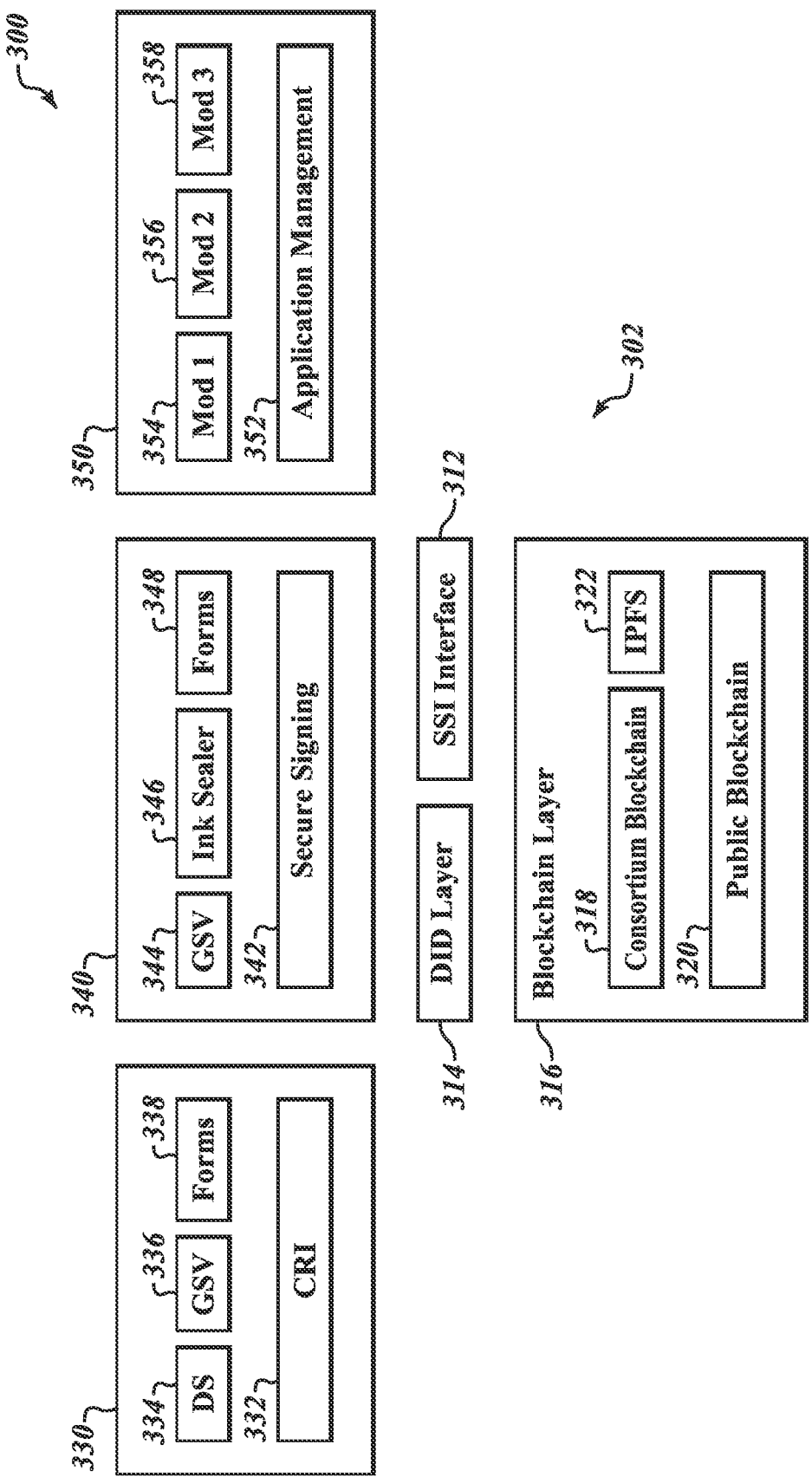
FIG. 3 illustrates an embodiment of architecture of a document workflow management system.

FIG. 3 illustrates an embodiment of architecture of a document workflow management system 300, which may be implemented using, for example, the environment 100 of FIG. 1; the system 200 of FIG. 2; etc. As illustrated, the architecture 300 comprises a backend engine or technology layer 302, which may support multiple use cases or applications, and may be implemented using one or more application servers, such as the servers 130 of FIG. 1, including in a distributed manner. The illustrated applications include a secure document management application 330, a secure signing application 340, and one or more other applications 350, and may be implemented, for example, as an application executing on user device, such as the client devices 110 illustrated in FIG. 1.

The backend 302 comprises a decentralized identifier (DID) interface, as illustrated self-sovereign identity (SSI) interface 312, a (DID) layer 314, and a blockchain layer 316. The blockchain layer 316 includes or communicates with a distributed ledger system (DLT), such as consortium blockchain engine 318, a public blockchain engine 320 and a distributed file system manager, for example, as illustrated an IntraPlanetary File System (IPFS) manager 322. Distributed ledger systems other than blockchain-backed systems may be employed in some embodiments. In addition, local databases, other distributed file systems, etc., or combinations thereof, may be employed in some embodiments.

SSI is a decentralized identifier protocol that allows a unique existence of identity detached from any ID system, and the SSI interface 312 provides SSI services in accordance with the applicable SSI protocol. The decentralized identifier (DID) layer 314 is a resolver having an SSI agent that generates verifiable credentials (VCs) or proofs in accordance with a decentralized identifier protocol or standard and an SSI protocol or standard. Any application protocol that is compatible or can interface with an SSI-based workflow may be employed, such as DIDCOMM messaging. A verifiable credential is a set of claims and metadata with ownership than can be cryptographically verified by the issuer. The owners can prove something based on validation from the issuer.

The blockchain layer 316 performs transactions associated with DID documents and stores the DIDs or VCs. The consortium blockchain engine 318 manages nodes that record and validate a transaction, and stores the DIDs (time and order). A blockchain consortium is a type of network where multiple entities maintain the system. For example, a group of companies may collaborate on adaption of a blockchain technology standard, define use cases, develop infrastructure and operate blockchain platforms (e.g., commercial platforms). The public blockchain engine 320 manages backing up of transactions (blockchains) on a public domain or public trust. The IPFS engine 322 manages a file system shared between the consortium nodes to facilitate registration of DID documents in the nodes of the distributed file system.

The secure document management application 330, as illustrated, includes an SSI agent, as illustrated an extended creative rights initiative CRI engine or interface 332, a document sealer engine 334, a signature validation engine (GSV) 336, and a forms engine 338. The SSI agent or CRI engine 332 manages communications between the secure document application 330 and the SSI interface 312 and DID layer 314 of the backend engine 302, and coordinates operation of the document sealer engine 334, the signature validation GSV engine 336 and the forms engine 338 to provide secure document application services. The document sealer 334 allows users to create a signature, for example, using a tablet and stylus, to add a signature to documents. The signature validation engine GSV 336 verifies signatures that are applied to documents, and may employ asymmetric cryptography techniques, biometric validation techniques, etc., and various combinations thereof. The forms engine 338 generates forms, such as contracts, ownership records, evolving documents, etc., that may be employed by users of the document management system 330. The generated forms may include signature blocks for the application of signatures.

The secure signing application 340, as illustrated, includes secure signing engine or interface 342, a signature validation engine (GSV) 344, an ink sealer engine 346, and a forms engine 348. The secure signing engine 342 manages communications between the secure signing application 340 and the SSI interface 312 and DID layer 314 of the backend engine 302, and coordinates operation of the signature validation engine (GSV) 344, the ink sealer engine 346, and the forms engine 348, to provide secure signing application services. The signature validation engine 344 verifies signatures applied to documents, and may employ asymmetric cryptography techniques, biometric validation techniques, etc., and various combinations thereof. The ink sealer engine 346 allows users to create a verifiable digital signature to add to documents. The ink sealer engine 346 generates metadata (e.g., a hash or other signature details) associated with a signature, may encrypt the metadata with a signor key (e.g., a key associated with a doctor in a medical context), and manages the creation of data store records and a DID document associated with the signature. The forms engine 348 generates forms, such as medical treatment forms, etc., that may be employed by users of the secure signing system 340. The generated forms may include, for example, medical records (e.g., treatment authorization forms), ownership records, contracts, evolving documents, etc., and may have signature blocks for the application of verifiable signatures.

The other applications 350 may provide other types of services, such as digital rights management (DRI), such as copyright control applications or music service applications, educational service applications, etc., and may include an application management engine or interface 352, and various modules 354, 356, 358, to provide user services associated with the various applications.

Figure 4:
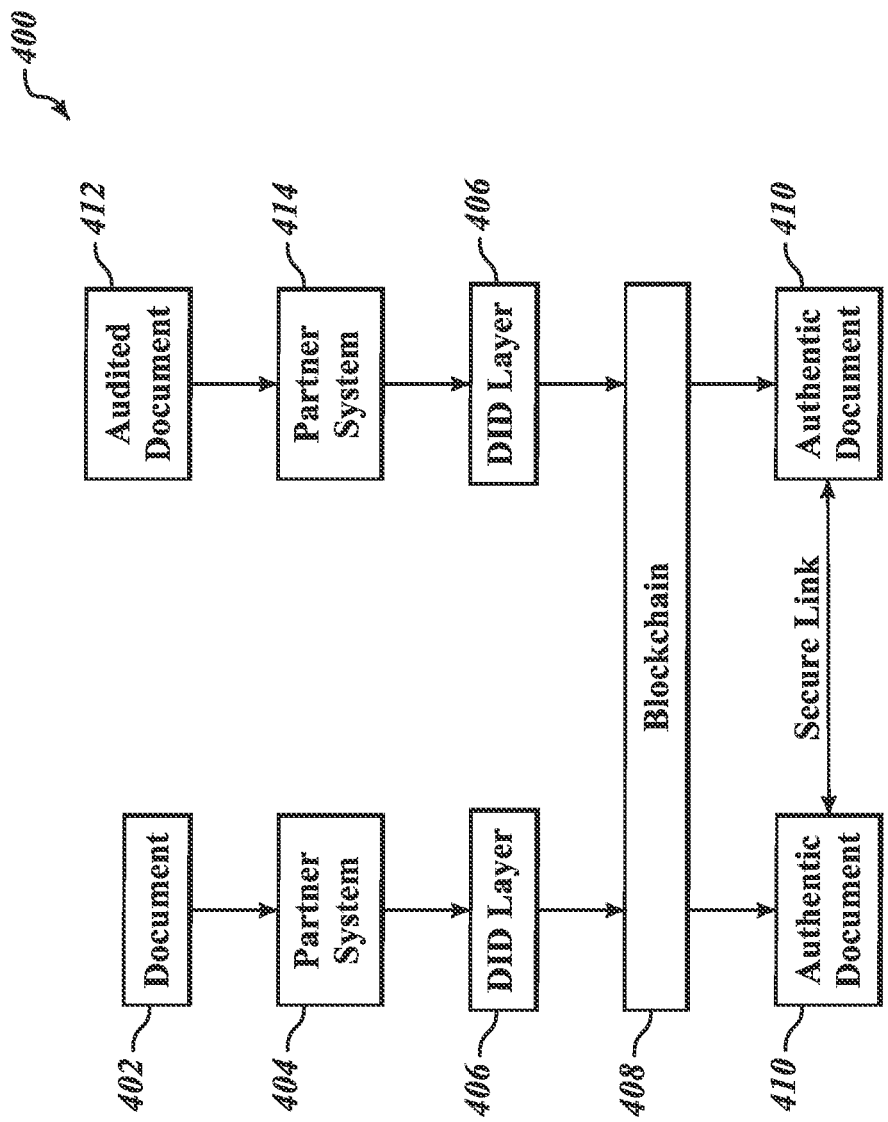
FIG. 4 is a conceptual diagram illustrating a relational web 400 for generating and authenticating document decentralized identifiers (DIDs) using blockchain records.

FIG. 4 is a conceptual diagram illustrating a relational web 400 for generating and authenticating document DIDs using blockchain records. A document 402 is presented to or created by a partner system 404. For example, a document may be created by an application, such as one of the applications 330, 340, 350 of FIG. 3. The partner system 404 initiates creation of a DID by a DID layer 406 of a backend engine, such as the DID layer 314 of the backend engine 302 of FIG. 3. The DID takes the form of a blockchain record 408 of an authentic document 410. The partner system may be a vertical system (e.g., provided by the same provider as the backend engine provider) or a system of another entity, such as a document management system of another provider.

As transactions related to the document occur, such as execution of a contract, approval of a treatment program, performance of the treatment program, etc., the transactions are linked to the document in the DID blockchain record 408. For example, if a new signature is added (e.g., approval), a new DID is created for that signature, and VCs are created by the new DID and issued to the old DID to prove the link between the new signature and the old DID. A new DID would be created for the new document version, and VCs issued to prove the links between the two. The DID for the new signature would have a VC that proves the link to the new DID for the document, and the new DID for the latest version of the document would have a VC linking the ownership to the previous version.

When a document 412 is subsequently presented to the partner system 414 (which may be a different partner system or the same partner system as the partner system 404), for example, to obtain a counter signature on a contract, to obtain a treatment authorized by the document, etc., the document may be audited to confirm the authenticity of the document, e.g., before a counter signature is applied, or before treatment provided. The partner system 414 initiates an audit of the DID by the DID layer 406 of a backend engine, such as the DID layer 314 of the backend engine 302 of FIG. 3. The authenticity of the document, and the transactions associated therewith (e.g., signing events), may be verified using the blockchain 408. The blockchain provides a secure link between records and authentic documents. The verification is performed by validation of the VCs that are issued to the DIDs representing the subjects (e.g., user, document, signature, modification, etc.), and may be performed using the externally stored blockchain file, which cryptographically links authenticated documents. The relationship between the documents and the associated records is managed in the SSI layer or interface of backend engine (e.g., SSI interface 312 of the backend engine 302 of FIG. 3). A backup is maintained on a public domain. If the audit confirms the authenticity of the document, a transaction may be perform (e.g., a countersignature applied to the document), with the transaction linked to the document in the blockchain.

Figure 5:
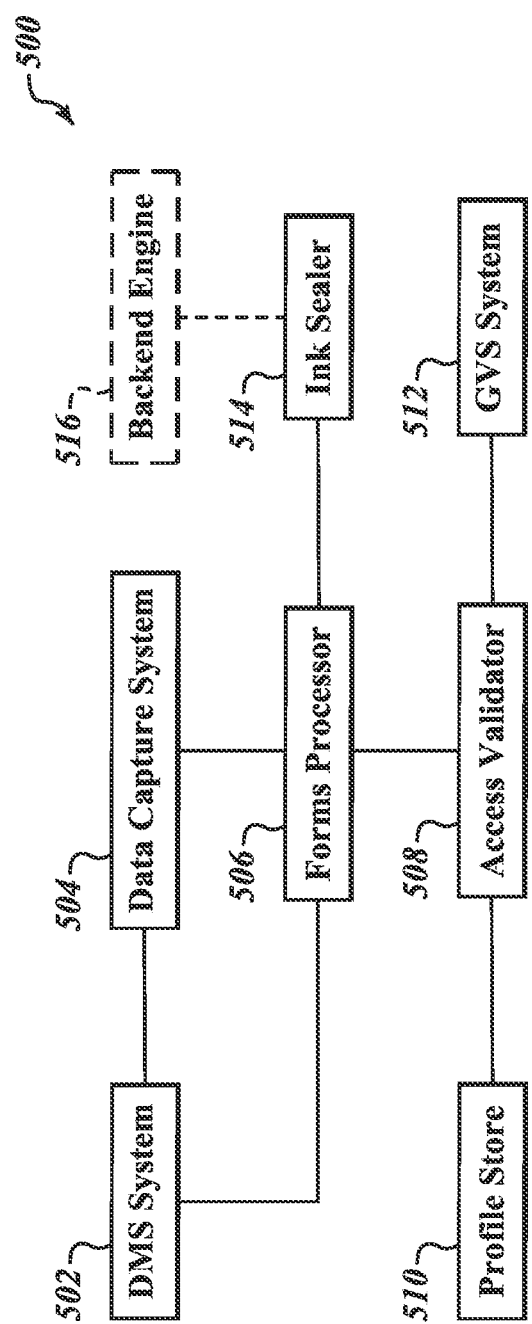
FIG. 5 is a block diagram illustrating an architecture of a secure signing application system.

FIG. 5 is a block diagram illustrating an architecture of a secure signing application system 500, which may be employed, for example, by the secure signing application 340 of FIG. 3. The secure signing application system facilitates authenticating persons authorized to sign original documents. The architecture 500 includes a document management system 502, which may generate or retrieve a document to be signed. A mobile data capture system 504, in operation, captures a signature for the document and a forms processor 506 incorporates the captured signature in the document. An access validator 508 verifies permissions associated with signing the document by obtaining a profile (e.g., template and certification information (who is authorized to sign)) from a profile store 510 and verifies signatures using a signature validation engine GSV 512. The verifying of the signature by the signature validation engine 512 may be performed locally, or using a remote server (e.g., via the cloud). Once the permissions are verified, an ink sealer 514 initiates sealing of the document and manages creation of a DID or recording of the signing (a transaction) on a blockchain of an existing DID by a backend engine 516 (e.g., the backend engine 302 of FIG. 3).

Figure 6:
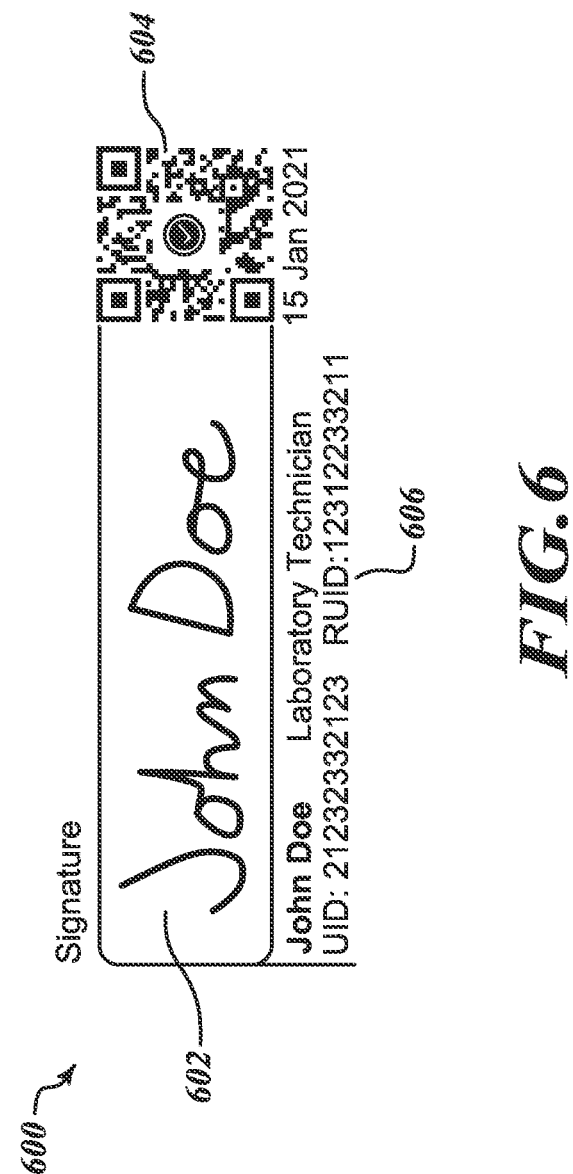
FIG. 6 illustrates an example signature generated by a secure signing application system.

FIG. 6 illustrates an example signature 600 generated by a secure signing application system, such as the secure signing application system 500 of FIG. 5 or the secure signing application 340 of FIG. 3. The signature 600 includes a reproduction of the verified signature 602, a QR code 604, and information about the person signing the document 606. The QR code resolves to a record on the relational web, and provides a cryptographic link between the signature 600 and the signed document.

Thus, the secure signing application provides a secure and verifiable digital document signing workflow. The workflow can be applied to any document format (e.g., ppt; pdf; docx; xls; etc.). A non-replicable original document is created with a relational structure. The original documents are encrypted and stored in a globally resolvable system to enable dispute management and to fetch the original copy. An audit trail is provided by the attributes supplied by the SSI system, with the authenticity of the issuers of the VCs embedded in the blockchain, so evolving documents and signatures may be audited to verify each individual step using blockchain technologies. For example, the VCs have the proofs, and contain a digital signature of a signer whose public key can be linked to a record on blockchain. The owner of the public key can be verified using cryptographic challenges via standard (e.g. PKI) workflows. The blockchain for example stores the references or entries to DIDs, creation of IDs for DID documents (order and time of creation). The blockchain also could store a VC directly or a HASH of a VC, and could store creation information for VCs.

Figure 7:
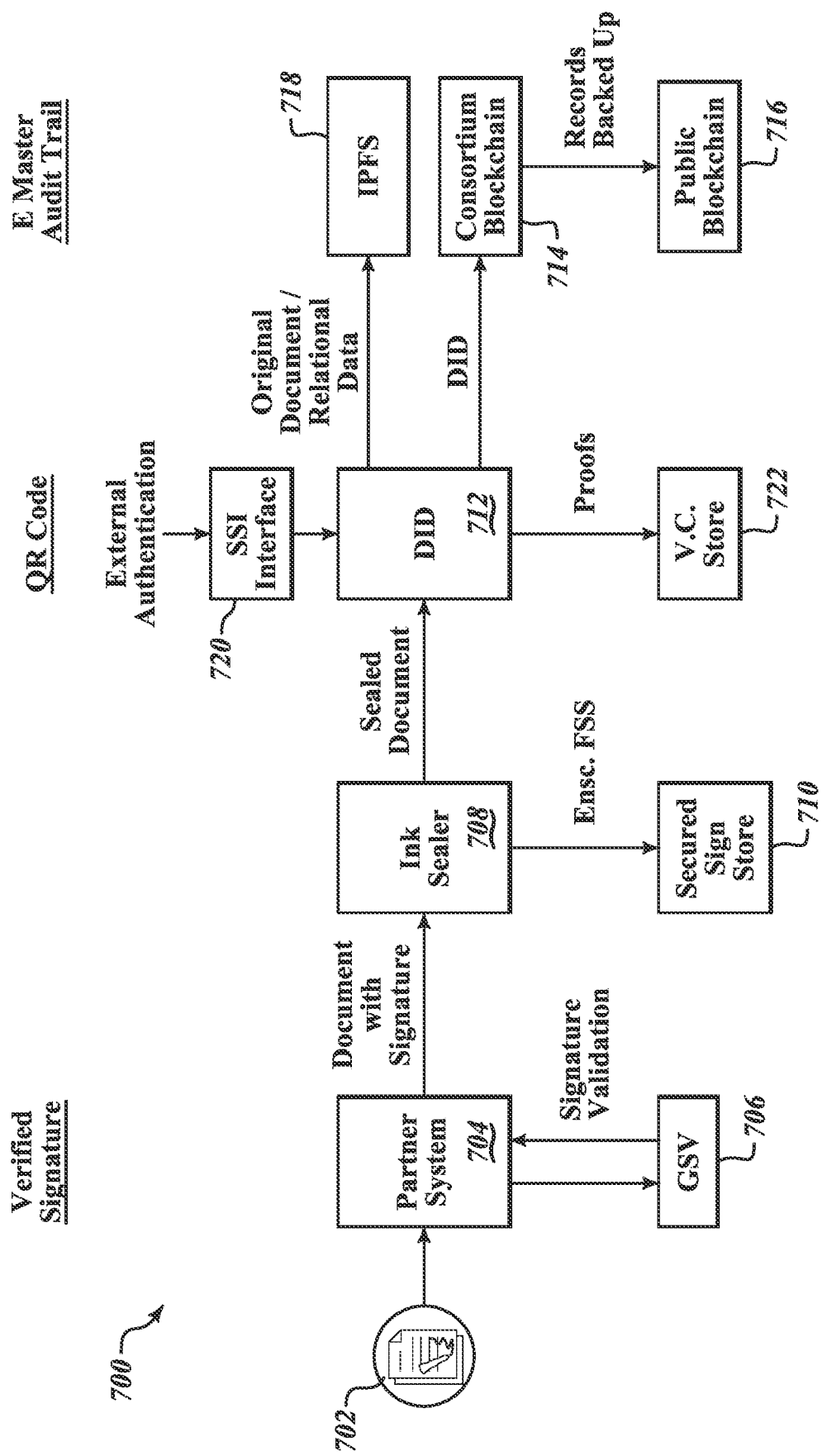
FIG. 7 is a flow diagram illustrating an example data flow a secure document signing workflow.

FIG. 7 is a flow diagram illustrating an example data flow a secure document signing workflow 700. A document with a signature 702 is presented to a partner system 704. The partner system 704 validates the signature using a GSV engine 706, for example, by comparing biometrics of the signature with stored biometric information. The document with the validated signature is provided to an ink sealer engine 708. The ink sealer engine 708 generates metadata associated with the signature (e.g., biometric information and checksum keys) and stores the metadata in a forensic signature store 710. The stored signature data may be encrypted with a key associated with the signer of the document (e.g., a doctor signing an order for treatment). The ink sealer 708 also creates a visual representation of the signature object that can be applied to the resultant document. The visual representation includes the QR code that is the DID for the signature object.

The ink sealer 708 initiates creation of a DID document for signature by a DID engine 712, such as the DID engine 314 of the backend engine 302 of FIG. 3. The DID engine 712 manages storage and registration of the DID document for signature using consortium blockchain engine 714, with a backup stored using a public blockchain engine 716. The DID engine 712 also manages storage of the original document and relational data using an IPFS interface 718. The DID engine 712 requests generation of a DID document for signature by an SSI interface 720, which may authenticate a QR code associated with the document. The QR codes for the signature resolve to the DID documents for the signature objects. A DID document provides 'services' which are endpoints that allow you to resolve the VCs that are issued to the DID document. In an embodiment, these VCs define the links and proofs (such as hashes) that link the documents, signature and entities together.

If the DID document for signature is successfully created, the DID engine 712 generates verifiable credentials for signature, which are issued to the DID document for signature and stored in verifiable credential store 722. The partner system 704 generates a QR code for the created DID document for signature and adds a visual representation of the QR code to the document. As noted above, the QR code for the DID document for signature resolves to the original document.

Figure 8A:
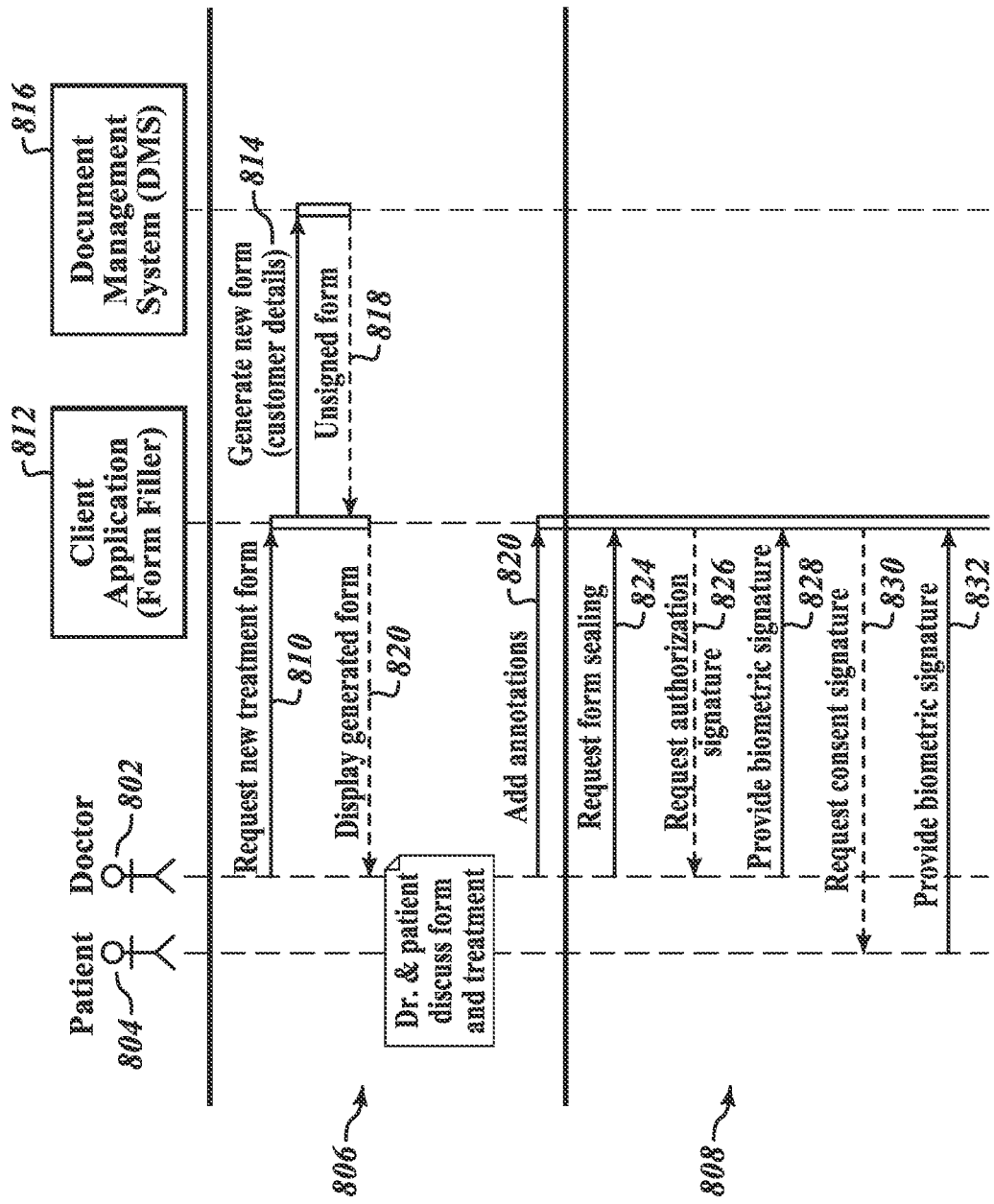
Figure 8B:
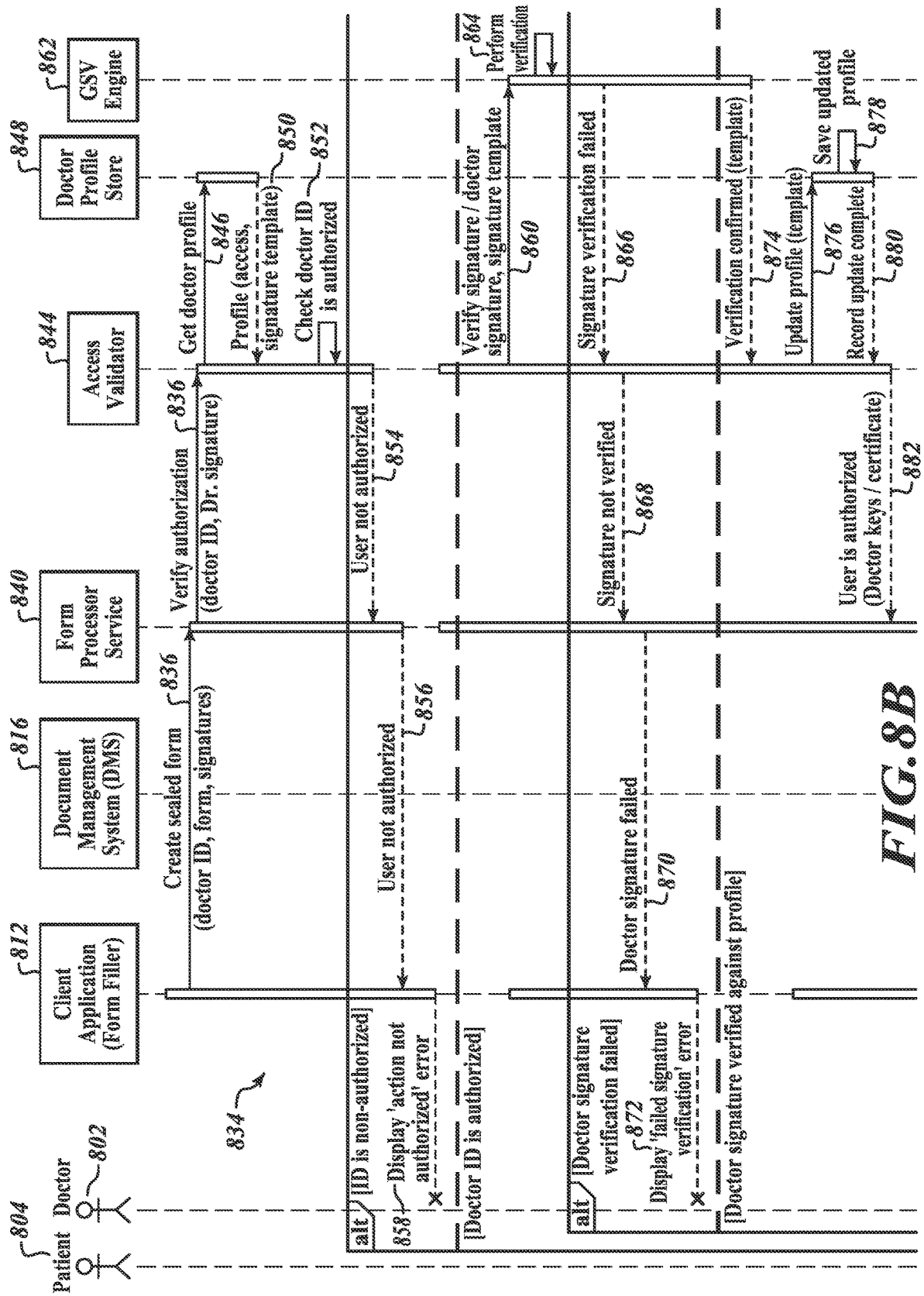
Figure 8D:
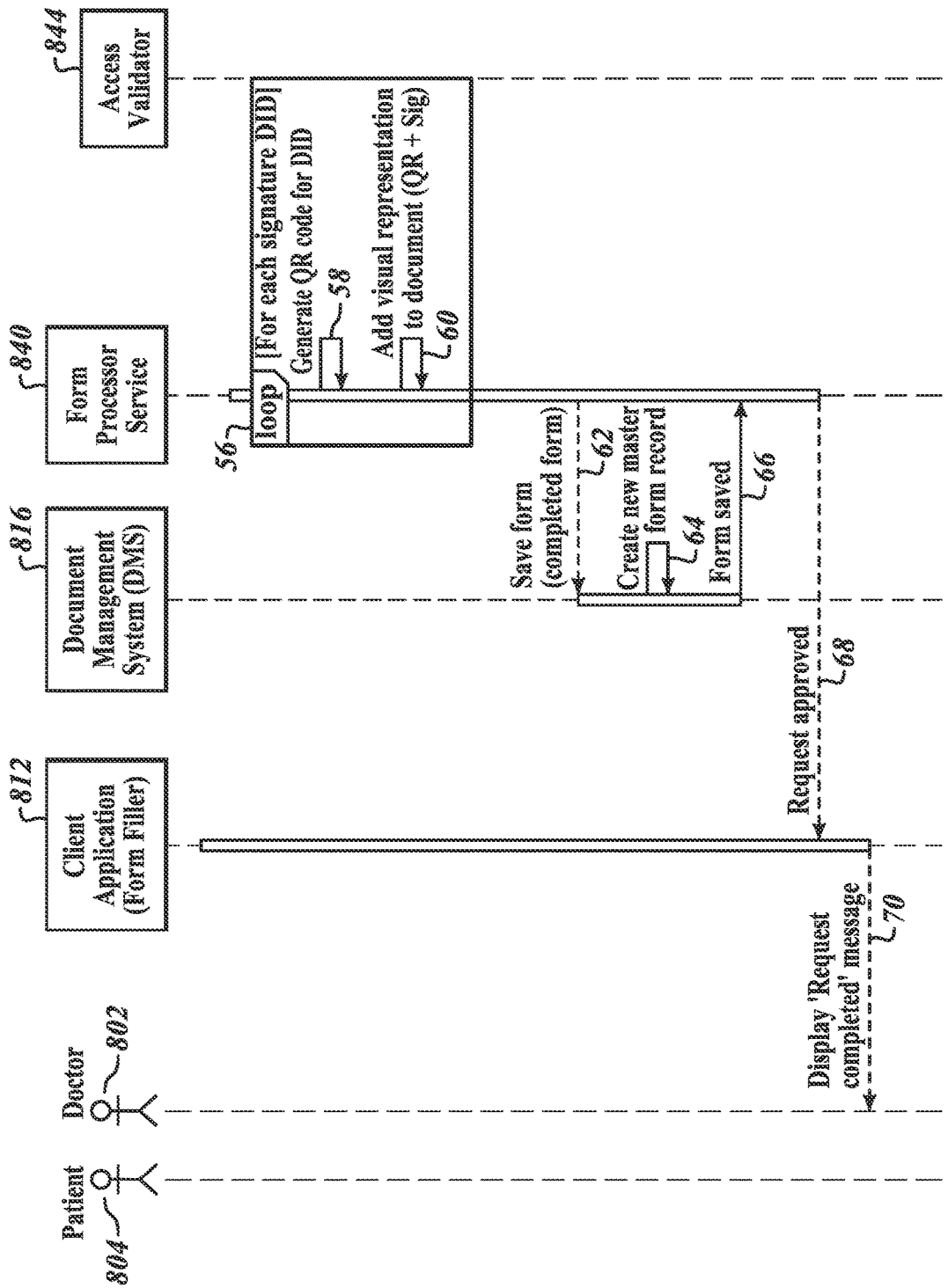

FIGS. 8 and 8A to 8D illustrate an example document workflow in the context of creating a signed treatment agreement between a doctor 802 and a patient 804. FIG. 8 illustrates an example overall document workflow, including component workflows illustrated in FIGS. 8A to 8D.

FIG. 8A illustrates an example workflow associated with initial form generation 806 and signature capture 808. As illustrated in FIG. 8A, in the initial form generation 806, the doctor 802 requests a new treatment form 810, as illustrated using a client application 812, such as the secure signing application system 500 of FIG. 5 or the secure signing application 340 of FIG. 3. The client application 812 responds to the received request by requesting generation of a new form 814 from a document management system 816, such as the DMS system 502 of FIG. 5. As illustrated, the request to generate a new form 814 includes customer details (e.g. the name and other personal information for the patient, insurance information, information related to the doctor and the treatment facility, etc.). The document management system 816 generates an unsigned form in response to the request to generate a new form 814, and provides the unsigned form 818 to the client application 812, which displays 820 the unsigned form. The doctor 802 and the patient 804 may discuss the form and a proposed treatment. The doctor 802 annotates the form 822, as illustrated using the client application 812. For example, the doctor 802 may indicate a treatment plan in annotating the form.

In the signature capture workflow 808, as illustrated, the doctor 802 requests form sealing 824 using the client application 812. The client application 812 responds to the request for form sealing 824 by requesting an authorization signature 826. As illustrated, the doctor 802 responds by providing a biometric signature 828. The client application 812 also responds to the request for form sealing 824 by requesting a consent signature 830. As illustrated, the patient 804 responds by providing a biometric signature 832.

FIG. 8B illustrates an example workflow associated with a signature validation process 834. In response to receiving the biometric signatures (see 828 and 832 of FIG. 8A), the client application 812 creates a sealed form, as illustrated including an identification of the doctor, the form, and the signatures, and provides the sealed form 836 to a form processor service 840, such as the forms processor 506 of FIG. 5. The forms processor service 840 requests verification of the authorization 842 (e.g., verification that the doctor is authorized to request the treatment indicated by the form, the signatures are valid, the form template is valid, etc.) from an access validator 844, such as the access validator 508 of FIG. 5. The access validator 844 requests a doctor profile 846 from a doctor profile store 848, such as the profile store 510 of FIG. 5. The doctor profile store 848 provides a doctor profile 850 (e.g., access permissions and authorizations; a signature template) to the access validator 844, which checks whether the doctor is authorized 852.

In the event that the check 852 indicates the doctor is not authorized (e.g., the doctor ID is not an authorized ID), the access validator 844 indicates the user (doctor) is not authorized 854 to the forms process service 840. In turn, the forms process service 840 indicates to the client application 812 that the user (doctor) is not authorized 856. The client application 812 responds to the indication that the user (doctor) is not authorized 856 by displaying an error message 858 indicating the requested action is not authorized.

In the event that the check 852 indicates the doctor is authorized (e.g., the doctor ID is an ID authorized to request the treatment), the access validator 844 requests validation of the doctor's signature 860 from a GSV engine 862, such as the GSV system 512 of FIG. 5. As illustrated the request for validation 860 includes doctor's biometric signature and signature template. The GSV engine 862 performs verification 864 on the signature.

In the event that the verification 864 indicates the signature verification failed, the GSV engine 862 indicates the signature verification failed 866 to the access validator 844, which indicates 868 to the forms process service 840 that the signature was not verified. In turn, the forms process service 840 indicates 870 to the client application 812 that the doctor signature failed. The client application 812 responds to the indication that the doctor signature failed 870 by displaying 872 an error message indicating the signature verification failed.

In the event that the verification 864 indicates the signature verification confirmed the doctor's signature, GSV engine 862 indicates the verification confirmed the doctor's signature 874 to the access validator 844. The access validator 844 responds to the indication the doctor's signature was confirmed 874 by requesting an update of the doctor profile 876 from the doctor profile store 848. The request 876 as indicated includes an updated profile template. The doctor profile store 848 responds to the update profile request 876 by saving an updated profile 878, and sending an indication to the access validator 844 that the record update is complete 880. The access validator 844 responds to the indication the record update is complete 880 by sending an indication the user (doctor) is authorized 882 to the forms process service 840.

The system may be viewed as acting as a user wallet, so the keys are provided to the ink sealer, and verifiable credentials are returned for storage. The profile store (e.g., the doctor profile store 848) or wallet may be internal to the system, or in some embodiments may be external.

FIG. 8C illustrates an example workflow associated with creating form and signature entries into an SSI system 884. As illustrated, the forms processor service 840 responds to the indication the user is authorized 882 of FIG. 8C, by requesting creation of a new secure record form 886 to an ink sealer 888, such as the ink sealer 514 of FIG. 5 or the ink sealer 346 of FIG. 3. The request 886 as illustrated includes the form, the signatures and the doctor keys.

The ink sealer 888 responds to the request to create a new secure record form 886 by creating, for each signature, a DID document for signature 890 (illustrated as a loop in FIG. 8C). The process of creating a DID document for signature as illustrated begins with the ink sealer 888 generating signature metadata 892, which as illustrated includes a hash and other details of the signature and form. The ink sealer 888 saves the signature metadata 894 in a secure data store 896, such as the forensic signature store 710 of FIG. 7. The secure data store 896 creates a forensic signature store record 898 of the metadata. The stored signature data may be encrypted with a key associated with the signer of the document (e.g., the doctor 802 of FIG. 8A). The secure data store provides an indication 2 that the FFS record 898 has been created to the ink sealer 888.

The ink sealer 888 responds to the indication 2 that the FFS record 898 has been created by requesting creation of a DID document for signature 4 by a SSI service 6, such as the SSI interface 720 of FIG. 7 or the SSI interface 312 of FIG. 3. The SSI service 6 creates a DID document for signature 8, and manages storage of the DID document for signature 10 via an IPFS interface 12, such as the IPFS interface 718 of FIG. 7. The IPFS interface 12 registers the DID document for signature 14, and sends an indication the DID document for signature has been saved 16 to the SSI service 6. The SSI service 6 responds to the indication the DID document for signature has been saved 16 by providing the DID document for signature 18 to the ink sealer 888. The process of creating a DID document for signature (as illustrated, loop 890) is repeated for each signature to be recorded on the document, e.g., for the doctor's signature and for the patient's signature.

Once the DID documents for signature associated with the form are created, the ink sealer 888 creates form metadata 20, such as one or more document hashes (e.g., a document hash before a signature, a document hash after the signature, or both, additional hashes for additional signatures, etc.) and the signature DIDs of the DID documents for signature. The ink sealer 888 requests creation of a new form record 22 by the SSI service 6. The request 22 as illustrated includes the form metadata and the doctor keys. The SSI service 6 requests registration of a DID for form record 24 by a blockchain service 26, such as the blockchain consortium service 714 of FIG. 7. The blockchain service 26 performs the transaction (stores the DID) 28, and sends an indication to the SSI service 6 that the transaction is complete 30.

The SSI service 6 responds to the indication that the transaction is complete 30 by creating a DID document for the form 32 and manages storage of the DID document for form 34 by the IPFS 12. The IPFS interface 12 registers the DID document for form 36, and sends an indication the DID document for form has been saved 38 to the SSI service 6.

For each signature DID, the SSI service 6 generates a verifiable credential for signature 40 issued to the signature DID in loop 42. When generation of the verifiable credentials is complete, the SSI service 6 sends the form DID, the signature DIDs and the collection of VC 44 to the ink sealer 888.

The ink sealer 888 responds to receipt of the form DID, the signature DID and the collection of VCs 44 by, for each verifiable credential of the form in loop 46, saving the verifiable credential 48 in the secure data store 896. The secure data store 896 creates a new verifiable signature VS entry and sends an indication the entry has been saved 52 to the ink sealer 888. After all the verifiable signatures are stored, the ink sealer 888 sends an indication to the forms processor service 840 that the creation of the signature DIDs is complete 54.

FIG. 8D illustrates the document flow after the creation of the signature DIDs is complete. The forms processor services 840 responds to the indication the creation of the signature DIDs is complete 54 by, for each signature DID in loop 56, generating a QR code for the signature DID 58 and adding a visual representation of the QR code (the QR plus the signature) 60 to the form. Once loop 56 has processed all the signature DIDs, the forms processor service 840 sends an request to save the form 62 to the document management service 816. The document management service 816 saves the form 64 and provides an indication the form has been saved 66 to the forms processor service 840. The forms processor service 840 responds to the indication the form has been saved 66 by sending an indication the request has been approved 66 to the client application 812, which indicates the request for a new treatment form 810 has been approved. The client application 812 displays a message 70 indicating the request is complete.

Embodiments of the document flow illustrated in FIGS. 8 and 8A to 8D may contain additional acts not shown in FIGS. 8 and 8A to 8D, may not contain all of the acts shown in FIGS. 8 and 8A to 8D, may perform acts shown in various orders, and may be modified in various respects.

Figure 9A:
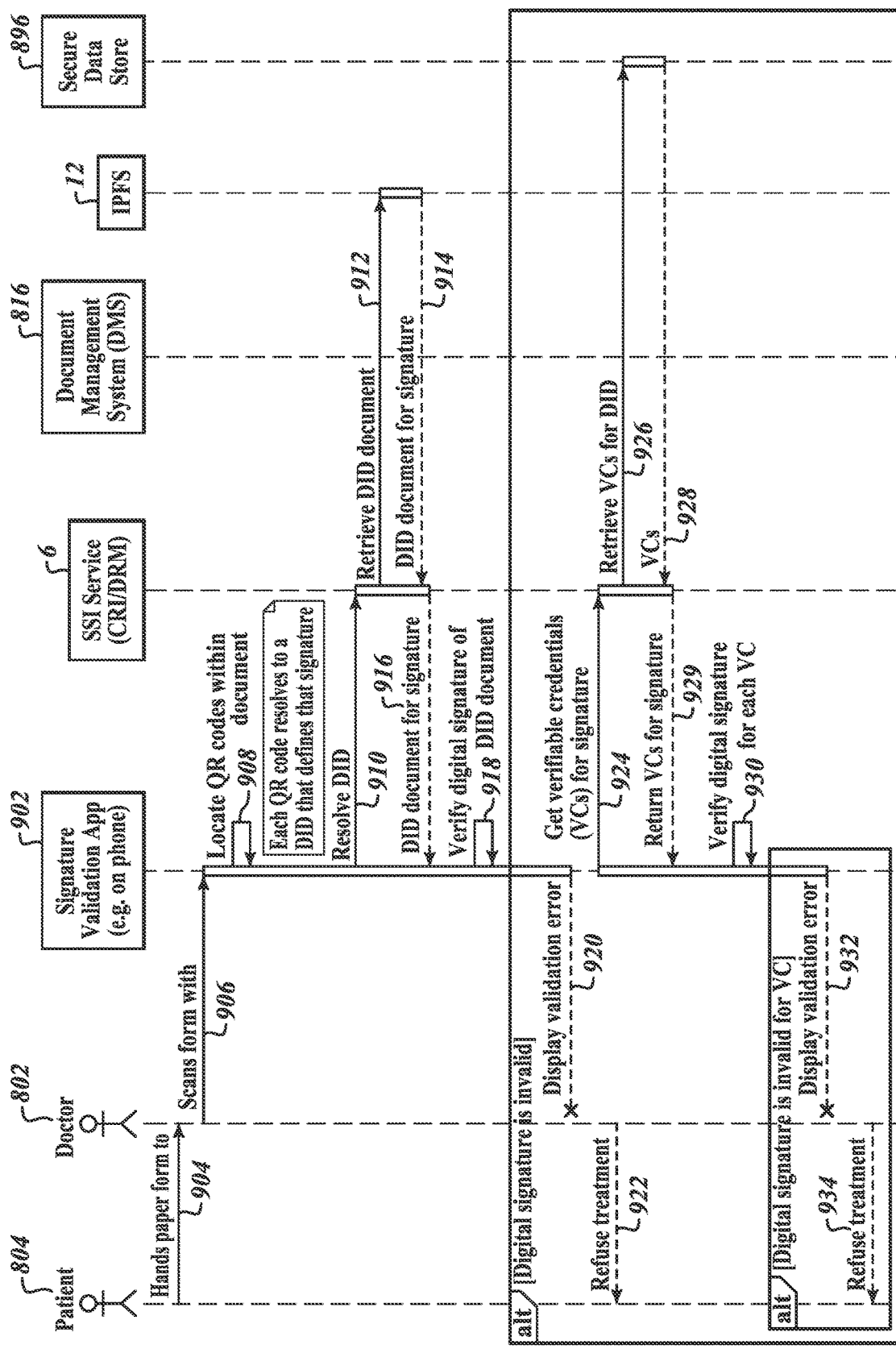
Figure 9B:
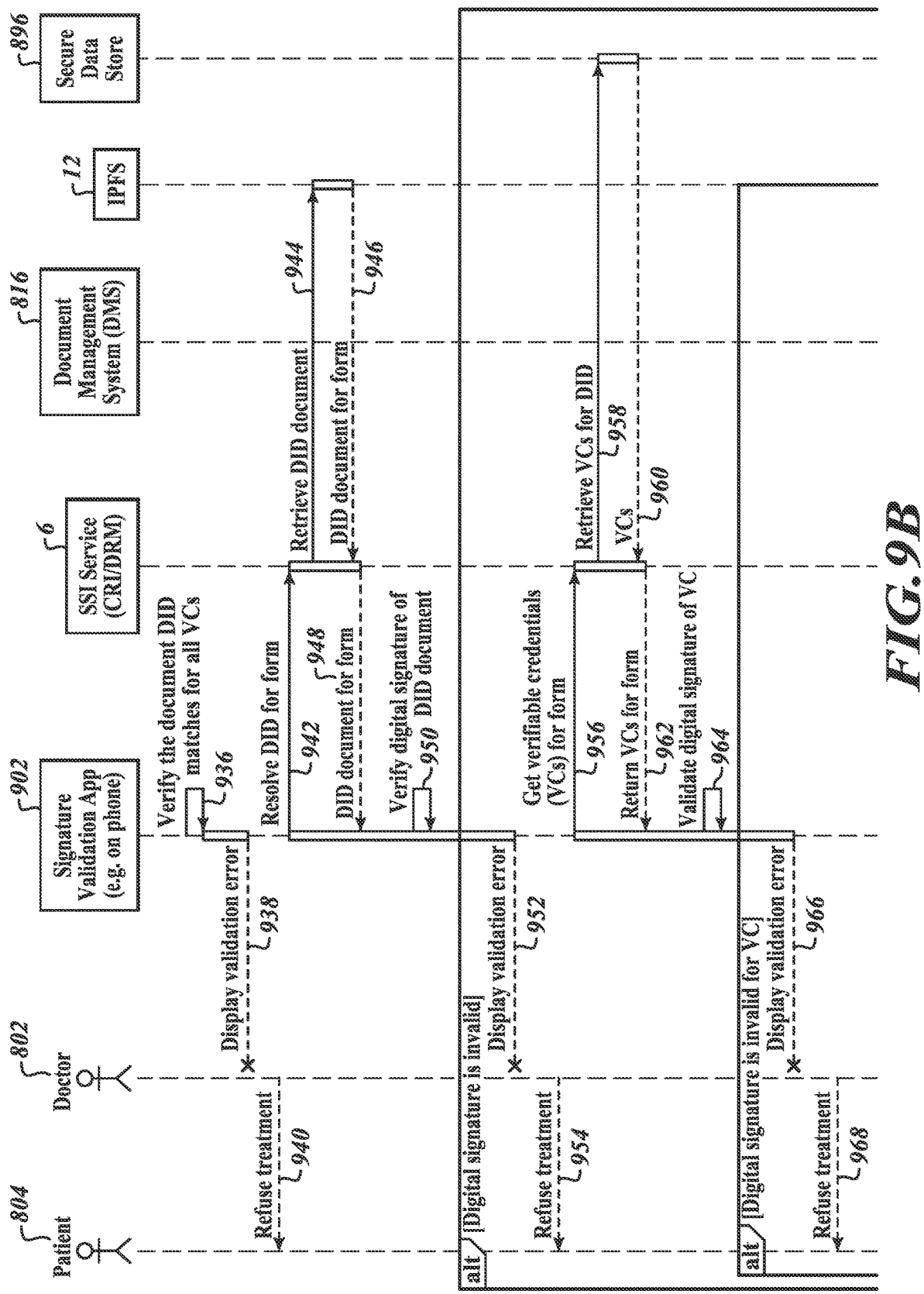
Figure 9C:
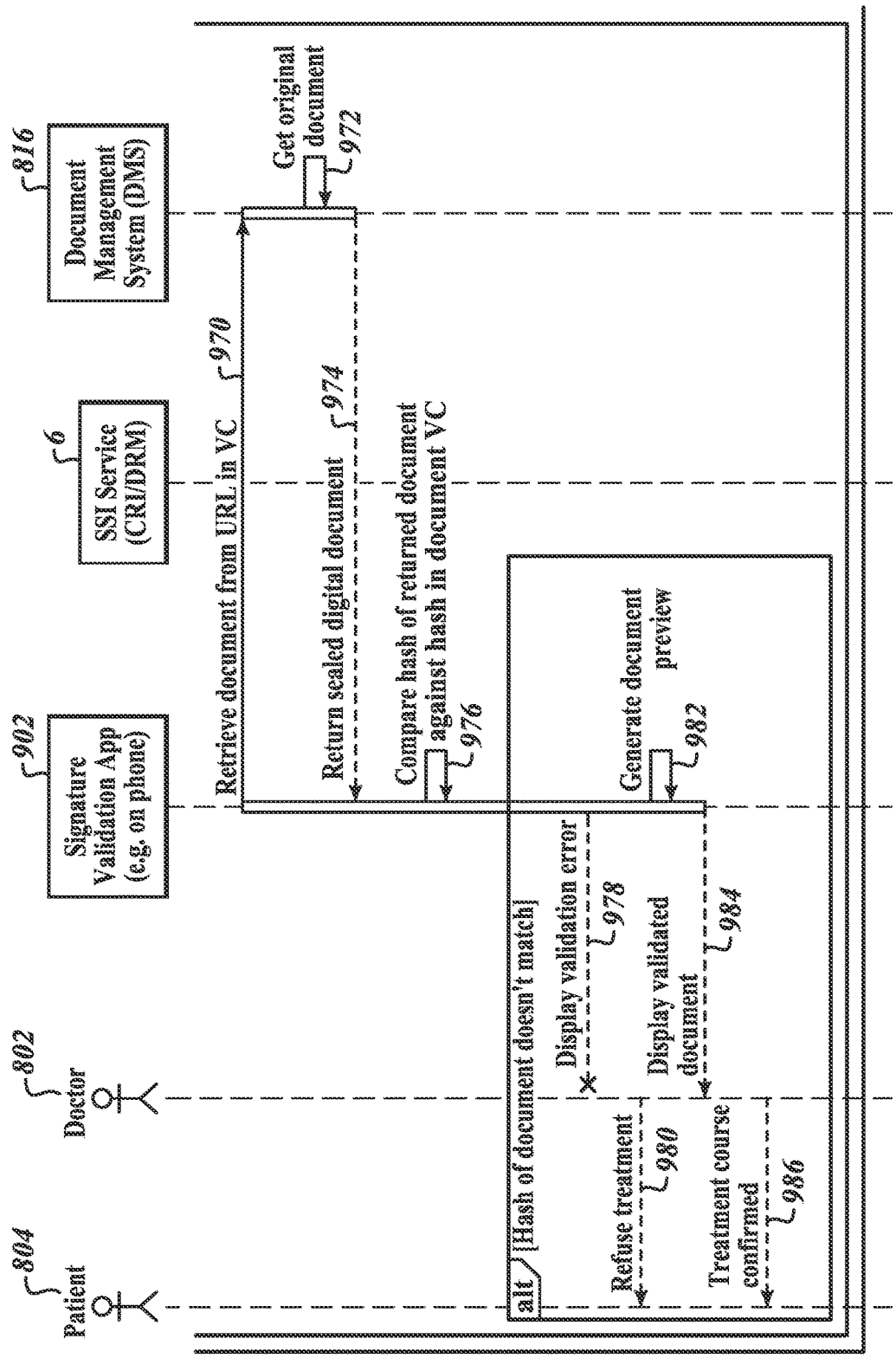

FIGS. 9 and 9A to 9C illustrate an example document workflow in the context of retrieving an original document using a QR code, such as a QR code for a one of the signatures on a treatment plan agreement between a doctor 802 and a patient 804 or a QR code for the treatment form. FIG. 9 illustrates an example overall document workflow, including component workflows illustrated in FIGS. 9A to 9C. As illustrated in FIG. 9A, the patient 802 hands or provides (e.g., an electronic copy) a treatment form 904 to a doctor 802. The doctor 802 scans the treatment form 906 using a signature validation application 902, such as an application executing on a smart phone. The signature validation application may be, for example, an embodiment of the secure document management application 330, the secure signing application 340, or one of the other applications 350 support by a backend engine such as the backend engine 302 of FIG. 3. The signature validation application 902 locates the QR codes 908 for signature DIDs within the document. Each QR code for a signature resolves to a DID that defines the signature. The signature validation application 902 initiates resolving 910 of one or more of the QRs via the SSI service 6, which sends a request to retrieve 912 the DID document to the IPFS 12. The IPFS 12 returns the DID document for signature 914 to the SSI service 6, which returns the DID document for signature 916 to the signature validation application 902. The signature validation application verifies the digital signature of the DID document 918, for example by confirming the scanned QR code retrieved a valid DID document for signature.

In the event the verification 918 fails (e.g., a valid digital signature was not retrieved for the document), signature validation application 902 displays a validation error message 920, and as illustrated, the doctor 802 refuses treatment 922.

If the verification at 918 is successful, the signature validation application 902 requests the verifiable credentials for the signature 924 from the SSI service 6, which sends a request to retrieve 926 the verifiable credentials to the secure data store 896. The secure data store 896 returns the verifiable credentials 928 to the SSI service 6, which returns the verifiable credentials 930 to the signature validation application 902. The signature validation application cryptographically validates 930 the digital signature for each VC.

In the event the cryptographic validation 930 fails, signature validation application 902 displays a validation error message 932, and as illustrated, the doctor 802 refuses treatment 934.

In the event the cryptographic validation of the VCs of the signatures at 930 is successful, document DID checks are performed, as shown in FIG. 9B. The verifiable credential for a signature contains a hash of the biometric signature FSS that was captured, as well as the DID for the original document for which the signature was captured, which should be common between all the signatures on the document. As illustrated, the signature validation application 902 verifies the document DID for all the validated signature VCs matches 936.

In the event the document DID for all the VCs does not match at 936, the signature validation application 902 displays a validation error message 938, and as illustrated, the doctor 802 refuses treatment 940.

In the event the document DID for all the validated VCs matches at 936, the signature validation application 902 initiates resolving 942 of the DID for the form via the SSI service 6, which sends a request to retrieve 944 the DID document for the form to the IPFS 12. The IPFS 12 returns the DID document for the form 946 to the SSI service 6, which returns the DID document for the form 948 to the signature validation application 902. The signature validation application verifies the digital signature of the DID document for the form 950, for example by confirming a valid DID document for the form was retrieved.

In the event the verification 950 fails (e.g., a valid digital signature was not retrieved for the DID document for the form), signature validation application 902 displays a validation error message 952, and as illustrated, the doctor 802 refuses treatment 954.

If the verification at 950 is successful, the signature validation application 902 requests the verifiable credentials for the form 956 from the SSI service 6, which sends a request to retrieve 958 the verifiable credentials for the form to the secure data store 896. The secure data store 896 returns the verifiable credentials 960 to the SSI service 6, which returns the verifiable credentials 962 to the signature validation application 902. The signature validation application cryptographically validates 964 the digital signature for the VC for the form. Other checks may be performed, such as verifying with the original issuer that VC is still valid. For example, VCs may have start and end dates, which also may be checked. (e.g., a prescription may have a validity start and a validity end date).

In the event the cryptographic validation 964 fails, signature validation application 902 displays a validation error message 966, and as illustrated, the doctor 802 refuses treatment 968.

The verifiable credentials for the document contains a URL that permits retrieval of the source document. The chain of trust generated by the DIDs and the VCs allows the application to be confident the URL is valid for the form. As shown in FIG. 9C, in the event the cryptographic validations 930, 964 are successful, the document at the URL is retrieved and checked. The signature validation application 902 sends a request to retrieve the document from the URL in the verifiable credentials 970 to the document management system 816, which obtains the original document 972 and returns the sealed document 974 to the signature validation application 902. The signature validation application 902 compares a hash of the returned document to a hash of the document verification credentials 976.

In the event the comparison 976 indicates the hash of the document does not match the hash of the VC credentials, signature validation application 902 displays a validation error message 978, and as illustrated, the doctor 802 refuses treatment 980. In the event the comparison 976 indicates the hash of the document does match the hash of the VC credentials, signature validation application 902 generates a treatment document preview 982 and displays a validated treatment document 984. As illustrated, the doctor 802 confirms the treatment course 986.

Embodiments of the document flow illustrated in FIGS. 9 and 9A to 9C may contain additional acts not shown in FIGS. 9 and 9A to 9C, may not contain all of the acts shown in FIGS. 9 and 9A to 9C, may perform acts shown in various orders, and may be modified in various respects.

While FIGS. 8 and 8A to 8D and 9 and 9A to 9C illustrate workflows in the context of treatment plans, the illustrated concepts can be applied in other more general contexts.

Figure 10:
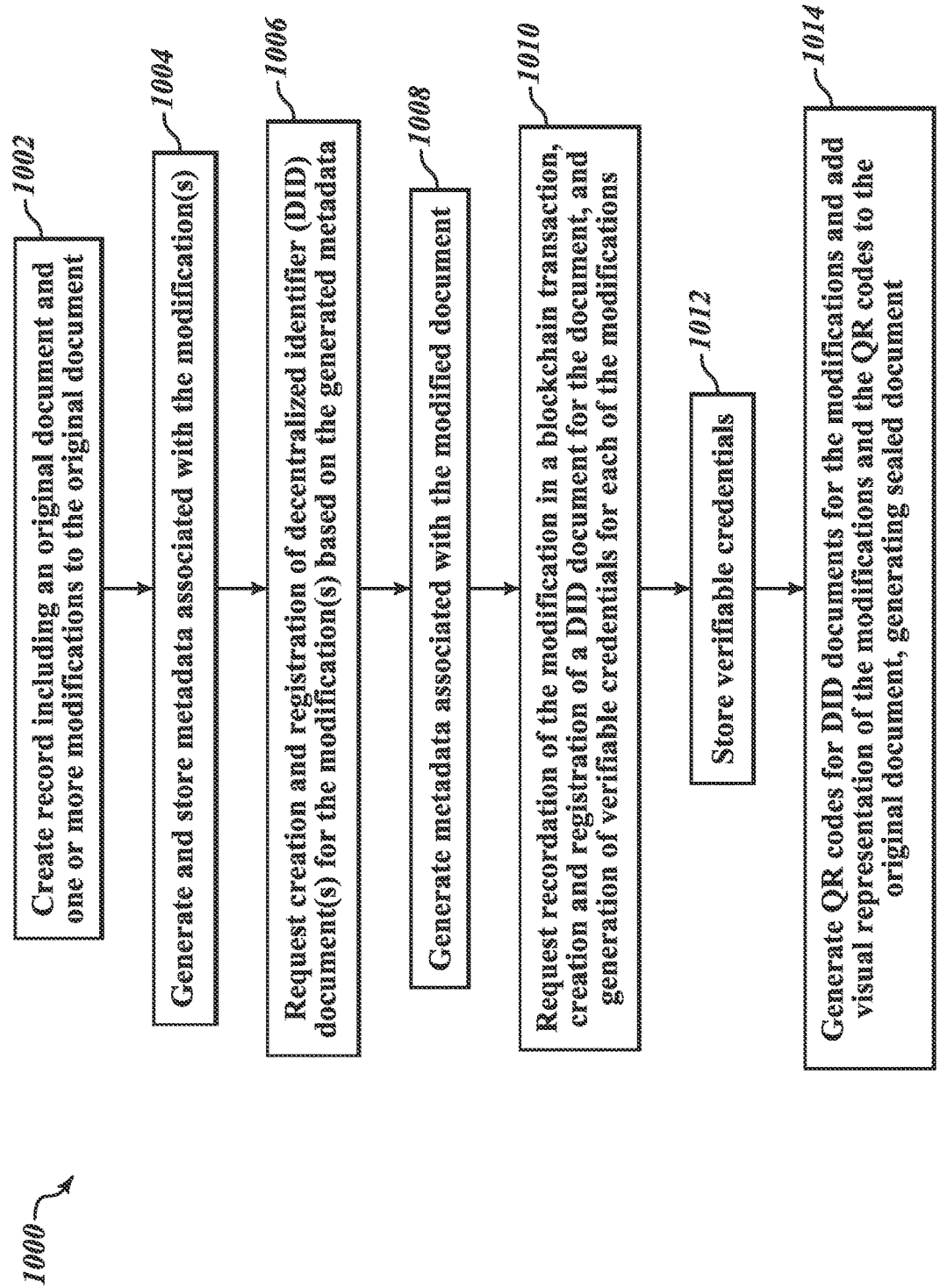
FIG. 10 is a flow diagram illustrating an embodiment of a method of generating a sealed document.

For example, FIG. 10 is a flow diagram illustrating an embodiment of a method 1000 of generating a sealed document, such as a document incorporating modifications to an original document, which may be employed, for example, in the environment 100 of FIG. 1 using one or more of the computing systems 200 of FIG. 2, the architecture of FIG. 3, etc. At 1002, the method creates a record including an original document and one or more modifications to the original document. For example, the method 1000 may create a record in response to a request to apply one or more signatures to a contract, a treatment plan, etc.; to document a proposed modification to the terms of a contract; etc.

The method 1000 proceeds from 1002 to 1004, where the method 1000 creates and stores metadata associated with the one or more modifications. For example, the metadata for each modification may be stored in a respective record of a forensic signature store.

The method 1000 proceeds from 1004 to 1006, where the method requests creation and registration of a decentralized identifier (DID) document for each of the one or more modifications based on the generated metadata for the modification. For example, an SSI service may be requested to create a DID for each modification, and register the modification on an IPFS.

In an embodiment, an initial DID would be created for a first representation of a document. Modifications to the document (e.g., a signature added to the document) could have their own DIDs created, then linked back to the initial DID, or subsequent versions of the document could be handled by the generation of VCs for new document hashes against versions, and VCs that link to the DIDs created for the signature events to the versions.

The method proceeds from 1006 to 1008, where the method 1000 generates modified document metadata including a document hash and the created DID documents for the modifications. The method proceeds from 1008 to 1010.

At 1010, the method 1000 requests recordation of the modifications in a blockchain transaction, creation and registration of a DID document for the document, and generation of verifiable credentials for each of the modifications. For example, an SSI service may be requested to manage recordation of the modifications in a blockchain transaction, creation and registration of a DID document for the document, and generation of verifiable credentials for each of the modifications. The method proceeds from 1010 to 1012, where the generated verifiable credentials for the modifications are stored, for example, in a VC store.

The method 1000 proceeds from 1012 to 1014, where the method 1000 generates a quick response (QR) code for the DID document for each modification and adds a visual representation of the modification and the QR code for the modification to the original document, generating a sealed document.

Figure 11:
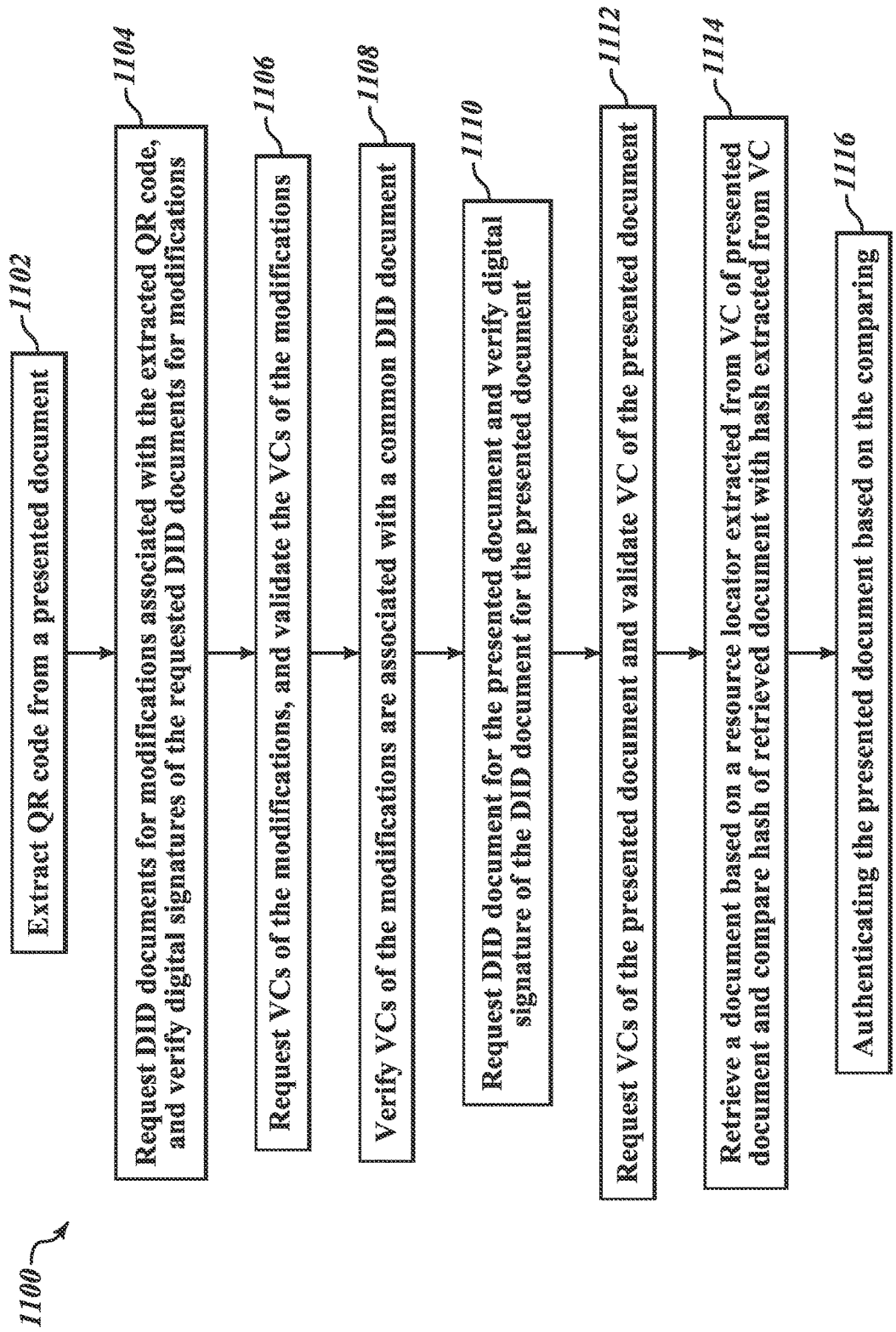
FIG. 11 is a flow diagram illustrating an embodiment of a method of authenticating a presented document.

In another example, FIG. 11 is a flow diagram illustrating an embodiment of a method 1100 of authenticating a presented document, such as a document incorporating modifications to an original document, which may be employed, for example, in the environment 100 of FIG. 1 using one or more of the computing systems 200 of FIG. 2, the architecture of FIG. 3, etc. At 1102, the method 1100 extracts a quick response (QR) code or codes from a presented document. The method 1100 proceeds from 1102 to 1104.

At 1104, the method 1100 requests DID documents for modifications associated with the extracted QR codes, and verifies digital signatures of the requested DID documents for modifications associated with the extracted QR codes. In response to successful verification of the digital signatures of the requested DID documents for modifications at 1104, the method 1100 proceeds from 1104 to 1106.

At 1106, the method 1100 requests verifiable credentials of the modifications, and cryptographically validates the requested verifiable credentials of the modifications. In response to successful validation of the requested verifiable credentials of the modifications, the method 1100 proceeds from 1106 to 1108.

At 1108, the method 1100 verifies the verifiable credentials of the modifications are associated with a common DID document. In response to successful verification the verifiable credentials of the modifications are associated with the common DID document, the method 1100 proceeds from 1108 to 1110.

At 1110, the method 1100 requests a DID document for the presented document and verifies a digital signature of the DID document for the presented document. In response to successful verification of the digital signature of the DID document for the presented document, the method 1100 proceeds from 1110 to 1112.

At 1112, the method 1100 requests verifiable credentials of the presented document and cryptographically validates the verifiable credentials of the presented document. In response to successful validation of the verifiable credentials of the presented document, the method proceeds from 1112 to 1114.

At 1114, the method 1100 retrieves a document based on a resource locator extracted from the verifiable credentials of the presented document and compares a hash of the retrieved document with a hash extracted from the verifiable credentials of the presented document. In response to the comparing indicating the hash of the retrieved document matches the hash extracted from the verifiable credentials, the method 1100 proceeds from 1114 to 1116. At 1116, the method 1100 authenticates the presented document based on the comparing. For example, in response to the comparing indicating a match, the presented document is authenticated.

Figure 12:
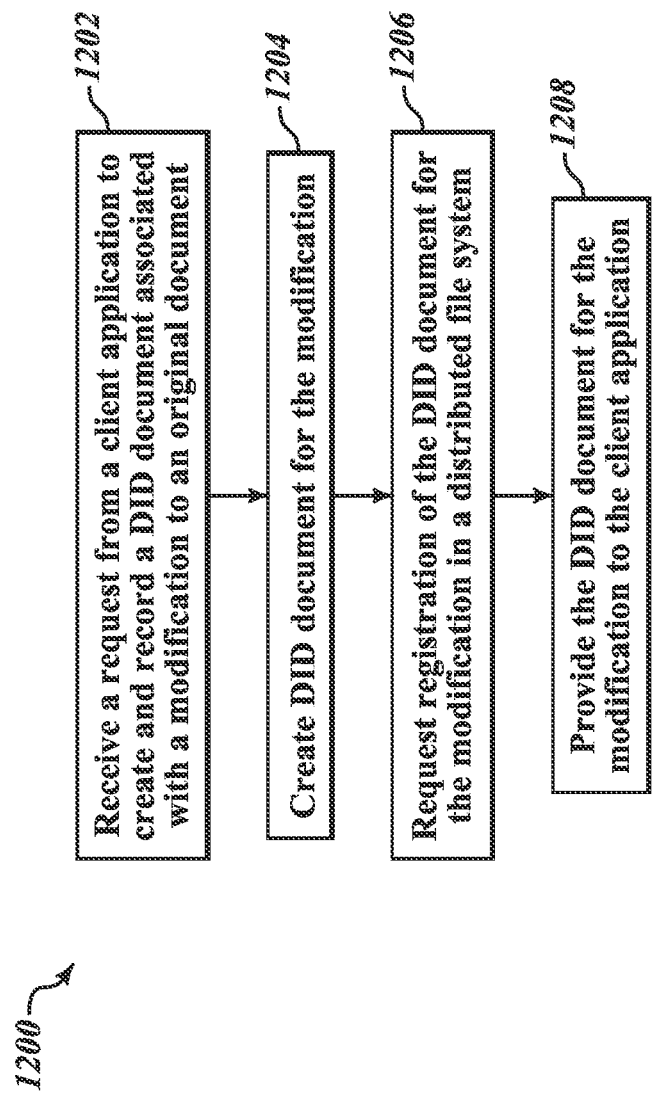
FIG. 12 is a flow diagram illustrating an embodiment of a method of responding to a request of a client application to create and record a decentralized identifier (DID) document associated with a modification to an original document.

In another example, FIG. 12 is a flow diagram illustrating an embodiment of a method 1200 of responding to a request, received from a client application, to create and record a decentralized identifier (DID) document associated with a modification to an original document, which may be employed, for example, in the environment 100 of FIG. 1 using one or more of the computing systems 200 of FIG. 2, the architecture of FIG. 3, etc.

At 1202, the method 1200 receives a request from a client application to create and record a DID document associated with a modification to an original document. The method 1200 proceeds from 1202 to 1204. At 1204, the method 1200 creates a DID document for the modification and proceeds to 1206. At 1206, the method 1200 requests registration of the DID document for the modification in a distributed file system. The method 1200 proceeds from 1206 to 1208. At 1208, the method 1200 provides the DID document for the modification to the client application.

Figure 13:
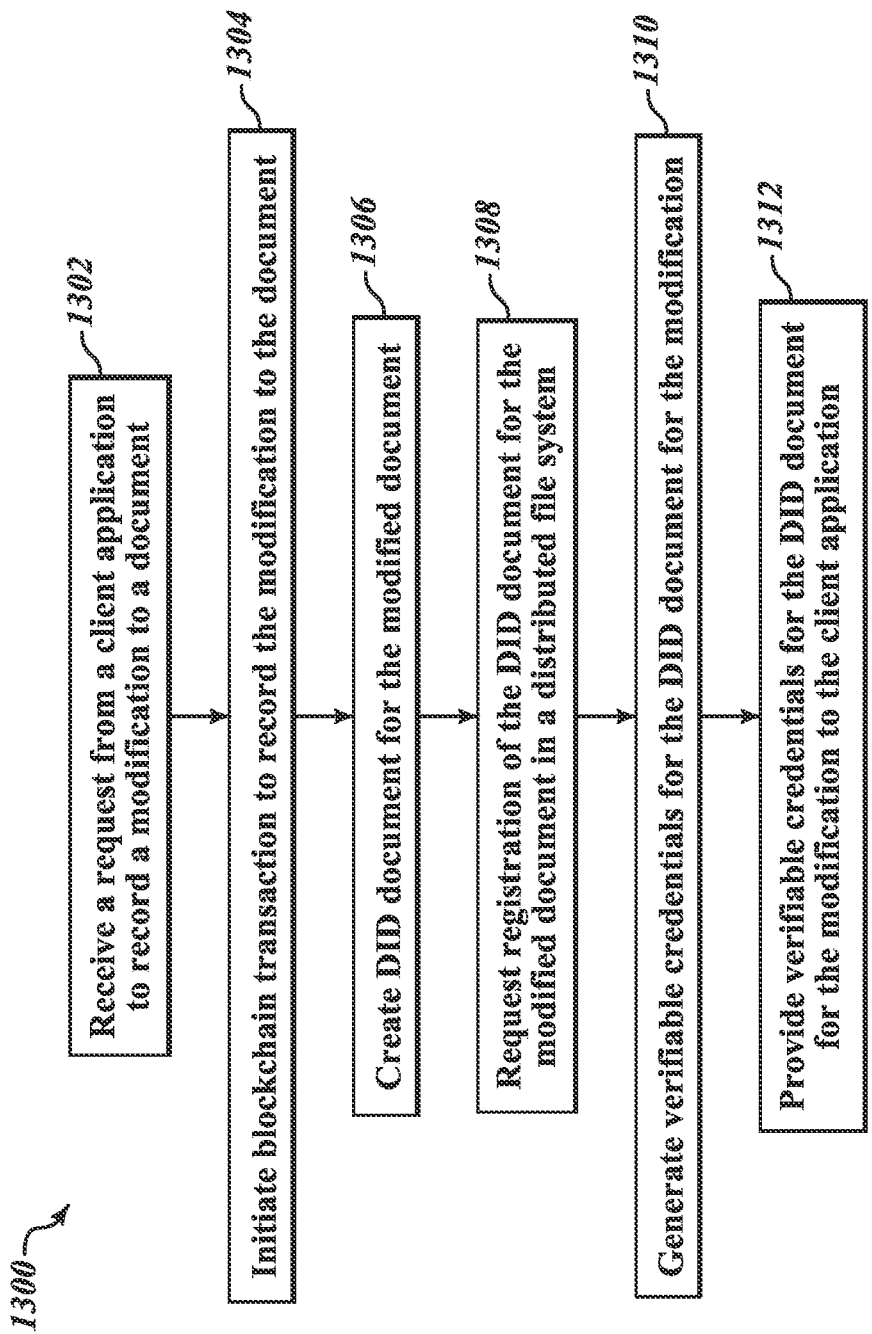
FIG. 13 is a flow diagram illustrating an embodiment of a method of responding to a request of a client application to record a modification to a document.

In another example, FIG. 13 is a flow diagram illustrating an embodiment of a method 1300 of responding to a request, from a client application, to record a modification to a document, such as the modification discussed above with reference to FIG. 12. The method 1300 may be employed, for example, in the environment 100 of FIG. 1 using one or more of the computing systems 200 of FIG. 2, the architecture of FIG. 3, etc.

At 1302, the method 1300 receives a request from a client application to record a modification to a document. The method 1300 proceeds from 1302 to 1304. At 1304, the method 1300 initiates a blockchain transaction to record the modification to the document, and proceeds to 1306. At 1306, the method 1300 creates a DID document for the modified document. The method 1300 proceeds from 1306 to 1308.

At 1308, the method 1300 requests registration of the DID document for the modified document in a distributed file system. The method 1300 proceeds from 1308 to 1310. At 1310, the method 1300 generates verifiable credentials for the DID document for the modification. The method 1300 proceeds from 1310 to 1312. At 1312, the method 1300 provides the verifiable credentials for the DID document for the modification to the client application.

In an embodiment, one DID for the document may be employed, and document modifications addressed by issuing VCs for updated document hashes (and new document locations), along with the VCs that link to the signature event (and in turn the signee). In other embodiments, a new DID for a document may be created for the modification, and the new DID document linked to the old DID document (via VCs). An example of when using multiple DIDs might be useful would be a new document that is generated as part of the workflow based on a previous document rather than signing the current document. For example, a work order that is signed to enable a contract or invoice to be draw up. In this flow, it might be useful for the work order and invoice to have DIDs in their own right, and have VCs to link the two DIDs.

Embodiments of the methods 1000, 1100, 1200, 1300 of FIGS. 10-13 may include more acts than illustrated, may include fewer acts than illustrated, may combine illustrated acts, may separate illustrated acts into multiple acts, etc., and various combinations thereof. For example, method 1100 of FIG. 11 may be modified to include acts of generating error messages in response to a failure of a verification act, failure of an authenticating act or failure of a comparing act. In another example, method 1200 of FIG. 12 and method 1300 of FIG. 13 may be combined in some embodiments. In another example, the DID document for the modification may be provided at act 1312 in addition to the verifiable credentials for the DID document.

In an embodiment, a device comprises a memory and processing circuitry coupled to the memory, which, in operation, generate a sealed document. The processing circuitry, in operation, creates a record including an original document and a modification to the original document, generates metadata associated with the modification to the original document, stores the modification in a data store, requests creation and registration of a decentralized identifier (DID) document for the modification based on the generated metadata, generates modified document metadata including a document hash and the created DID document for the modification, requests recordation of the modification in a blockchain transaction, creation and registration of a DID document for the modified document, and generation of verifiable credentials for the modification, stores the generated verifiable credentials for the modification, generates a quick response (QR) code for the DID document for the modification, and adds a visual representation of the modification and the QR code for the modification to the original document, generating the sealed document.

In an embodiment, the device comprises a signature capture device coupled to the processing circuitry and the memory. This facilitates modifications which include application of digital signatures captured by the signature capture device to original documents. In an embodiment, the processing circuitry, in operation, verifies an authenticity of a captured signature prior to creating the record, and responds to a failure of the verifying of the authenticity of the captured signature by generating an error message. In an embodiment, the original document is a form authorizing an activity and the processing circuitry, in operation, prior to creating the record, verifies an identity associated with the captured signature is authorized to authorize the activity, and responds to a failure of the verifying of the identity by generating an error message. In an embodiment, the record includes a second modification including application of a second signature to the original document. In an embodiment, the adding the visual representation comprises adding a signature block including the captured digital signature and the QR code for the DID document for the modification.

In an embodiment, the device comprises a signature capture device coupled to the processing circuitry and the memory. The original document is a treatment form and the modification is a first modification applying a provider signature captured by the signature capture device to the original document. The record includes a second modification applying a patient signature captured by the signature capture device to the original document.

In an embodiment, the processing circuitry, in operation, transmits the request for creation and registration of a decentralized identifier (DID) document for the modification to a self-sovereign identity server, and transmits the request for recordation of the modification in a blockchain transaction, creation and registration of a DID document for the document, and generation of verifiable credentials for the modification to the self-sovereign identity server.

In an embodiment, the generated modified document metadata includes a document hash of the original document. In an embodiment, the generated modified document metadata includes a document hash of the original document and a document hash of the modified document.

In an embodiment, a method is employed to generate a sealed document. The method includes creating a record including an original document and a modification to the original document. Metadata associated with the modification to the original document is generated. The modification is stored in a data store. Creation and registration is requested of a decentralized identifier (DID) document for the modification based on the generated metadata. Modified document metadata is generated and includes a document hash and the created DID document for the modification. Recordation of the modification in a blockchain transaction, creation and registration of a DID document for the modified document, and generation of verifiable credentials for the modification are requested. The generated verifiable credentials for the modification are stored. A quick response (QR) code for the DID document for the modification is generated. A visual representation of the modification and the QR code for the modification are added to the original document, generating a sealed document.

In an embodiment, the method includes capturing a digital signature using a signature capture device and applying the digital signature to the original document. In an embodiment, prior to creating the record, an authenticity of the captured signature is verified, and an error message is generated in response to a failure of the verifying of the authenticity of the captured signature. In an embodiment, the original document is a form authorizing an activity, and the method includes, prior to creating the record, verifying an identity associated with the captured signature is authorized to authorize the activity, and generating an error message in response to a failure of the verifying of the identity.

In an embodiment, the record includes a second modification including application of a second signature to the original document.

In an embodiment, the adding the visual representation comprises adding a signature block including the captured digital signature and the QR code for the DID document for the modification.

In an embodiment, the original document is a treatment form, the modification is a first modification applying a provider signature captured by the signature capture device to the original document, and the record includes a second modification applying a patient signature captured by the signature capture device to the original document.

In an embodiment, the method includes transmitting the request for creation and registration of a decentralized identifier (DID) document for the modification to a self-sovereign identity server, and transmitting the request for recordation of the modification in a blockchain transaction, creation and registration of a DID document for the document, and generation of verifiable credentials for the modification to the self-sovereign identity server.

In an embodiment, a system comprises a signature capture device, which, in operation, captures digital signatures, and processing circuitry coupled to the signature capture device. The processing circuitry, in operation, creates a record including an original document and a modification to the original document, generates metadata associated with the modification to the original document, stores the modification in a data store, requests creation and registration of a decentralized identifier (DID) document for the modification based on the generated metadata, generates modified document metadata including a document hash and the created DID document for the modification, requests recordation of the modification in a blockchain transaction, creation and registration of a DID document for the modified document, and generation of verifiable credentials for the modification, stores the generated verifiable credentials for the modification, generates a quick response (QR) code for the DID document for the modification, and adds a visual representation of the modification and the QR code for the modification to the original document, generating a sealed document. In an embodiment, the modification includes application of a digital signature captured by the signature capture device to the original document.

In an embodiment, the original document is a form authorizing an activity and the processing circuitry, in operation, prior to creating the record, verifies an identity associated with the captured signature is authorized to authorize the activity, and responds to a failure of the verifying of the identity by generating an error message. In an embodiment, the original document is a treatment form, the modification is a first modification applying a provider signature captured by the signature capture device to the original document, and the record includes a second modification applying a patient signature captured by the signature capture device to the original document.

In an embodiment, a non-transitory computer-readable medium's contents configure a processing system to implement a method. The method includes creating a record including an original document and a modification to the original document, generating metadata associated with the modification to the original document, storing the modification in a data store, requesting creation and registration of a decentralized identifier (DID) document for the modification based on the generated metadata, generating modified document metadata including a document hash and the created DID document for the modification, requesting recordation of the modification in a blockchain transaction, creation and registration of a DID document for the document, and generation of verifiable credentials for the modification, storing the generated verifiable credentials for the modification, generating a quick response (QR) code for the DID document for the modification, and adding a visual representation of the modification and the QR code for the modification to the original document, generating a sealed document.

In an embodiment, the method includes capturing a digital signature using a signature capture device, and applying the digital signature to the original document. In an embodiment, the contents comprise instructions executed by the processing system.

In an embodiment, a device comprises memory, and processing circuitry coupled to the memory. The processing circuitry, in operation, extracts quick response (QR) codes from a presented document, requests DID documents for modifications associated with the extracted QR codes, verifies digital signatures of the requested DID documents for modifications associated with the extracted QR codes, in response to successful verification of the digital signatures of the requested DID documents for modifications, requests verifiable credentials of the modifications, and cryptographically validates the requested verifiable credentials of the modifications, in response to successful validation of the requested verifiable credentials of the modifications, verifies the verifiable credentials of the modifications are associated with a common DID document, in response to successful verification the verifiable credentials of the modifications are associated with the common DID document, requests a DID document for the presented document and verifies a digital signature of the DID document for the presented document, in response to successful verification of the digital signature of the DID document for the presented document, requests verifiable credentials of the presented document and cryptographically validates the verifiable credentials of the presented document, in response to successful validation of the verifiable credentials of the presented document, retrieves a document based on a resource locator extracted from the verifiable credentials of the presented document and compares a hash of the retrieved document with a hash extracted from the verifiable credentials of the presented document, and in response to the comparing indicating the hash of the retrieved document matches the hash extracted from the verifiable credentials, authenticates the presented document.

In an embodiment, the processing circuitry, in operation, generates an error message indicating the presented document is not authentic in response to any of (i) a failure of the verifying of the digital signatures of the requested DID documents for modifications associated with the extracted QR codes, (ii) a failure of the validation of the requested verifiable credentials of the modifications, (iii) a failure of the verification that the verifiable credentials of the modifications are associated with the common DID document, (iv) a failure of the verification of the digital signature of the DID document for the presented document, (v) a failure of the validation of the verifiable credentials of the presented document, or (vi) a failure of the comparing indicating the hash of the retrieved document matches the hash extracted from the verifiable credentials.

In an embodiment, the device includes a document scanner coupled to the processing circuitry. The document scanner, in operation, scans the presented document.

In an embodiment, the presented document is a form and the DID documents for modifications are associated with signatures applied to the form. In an embodiment, the form is a treatment form including a provider signature associated with a first QR code and a patient signature associated with a second QR code.

In an embodiment, the processing circuity, in operation, transmits the requests for DID documents for modifications associated with the extracted QR codes to a self-sovereign identity server, transmits the requests for verifiable credentials of the modifications to the self-sovereign identity server, transmits the request for the DID document for the presented document to the self-sovereign identity server, and transmits the request for verifiable credentials of the presented document to the self-sovereign identity server.

In an embodiment, the processing circuitry, in operation, retrieves the document associated with the resource locator extracted from the verifiable credentials of the presented document from a document management server.

In an embodiment, a method comprises extracting quick response (QR) codes from a presented document, requesting DID documents for modifications associated with the extracted QR codes, verifying digital signatures of the requested DID documents for modifications associated with the extracted QR codes, in response to successful verification of the digital signatures of the requested DID documents for modifications, requesting verifiable credentials of the modifications, and cryptographically validating the requested verifiable credentials of the modifications, in response to successful validation of the requested verifiable credentials of the modifications, verifying the verifiable credentials of the modifications are associated with a common DID document, in response to successful verification the verifiable credentials of the modifications are associated with the common DID document, requesting a DID document for the presented document and verifying a digital signature of the DID document for the presented document, in response to successful verification of the digital signature of the DID document for the presented document, requesting verifiable credentials of the presented document and cryptographically validating the verifiable credentials of the presented document, in response to successful validation of the verifiable credentials of the presented document, retrieving a document based on a resource locator extracted from the verifiable credentials of the presented document and comparing a hash of the retrieved document with a hash extracted from the verifiable credentials of the presented document, and in response to the comparing indicating the hash of the retrieved document matches the hash extracted from the verifiable credentials, authenticating the presented document.

In an embodiment, the method includes generating an error message indicating the presented document is not authentic in response to any of a failure of the verifying of the digital signatures of the requested DID documents for modifications associated with the extracted QR codes, a failure of the validation of the requested verifiable credentials of the modifications, a failure of the verification that the verifiable credentials of the modifications are associated with the common DID document, a failure of the verification of the digital signature of the DID document for the presented document, a failure of the validation of the verifiable credentials of the presented document, or a failure of the comparing indicating the hash of the retrieved document matches the hash extracted from the verifiable credentials.

In an embodiment, the method includes scanning the presented document. In an embodiment, the presented document is a form and the DID documents for modifications are associated with signatures applied to the form. In an embodiment, the form is a treatment form including a provider signature associated with a first QR code and a patient signature associated with a second QR code.

In an embodiment, the method includes transmitting the requests for DID documents for modifications associated with the extracted QR codes to a self-sovereign identity server, transmitting the requests for verifiable credentials of the modifications to the self-sovereign identity server, transmitting the request for the DID document for the presented document to the self-sovereign identity server, and transmitting the request for verifiable credentials of the presented document to the self-sovereign identity server. In an embodiment, the method includes retrieving the document associated with the resource locator extracted from the verifiable credentials of the presented document from a document management server.

In an embodiment, the method includes creating a record including an original document and a modification to the original document, generating metadata associated with the modification to the original document, storing the modification in a data store, requesting creation and registration of a decentralized identifier (DID) document for the modification based on the generated metadata, generating modified document metadata including a document hash and the created DID document for the modification, requesting recordation of the modification in a blockchain transaction, creation and registration of a DID document for the modified document, and generation of verifiable credentials for the modification, storing the generated verifiable credentials for the modification, generating a quick response (QR) code for the DID document for the modification, and adding a visual representation of the modification and the QR code for the modification to the original document, generating a sealed document. In an embodiment, the method includes presenting the sealed document for authentication.

In an embodiment, a system comprises a document scanner, which, in operation, scans documents, and processing circuitry coupled to the document scanner. The processing circuitry, in operation, extracts quick response (QR) codes from a scanned document, requests DID documents for modifications associated with the extracted QR codes, verifies digital signatures of the requested DID documents for modifications associated with the extracted QR codes, in response to successful verification of the digital signatures of the requested DID documents for modifications, requests verifiable credentials of the modifications, and cryptographically validates the requested verifiable credentials of the modifications, in response to successful validation of the requested verifiable credentials of the modifications, verifies the verifiable credentials of the modifications are associated with a common DID document, in response to successful verification the verifiable credentials of the modifications are associated with the common DID document, requests a DID document for the presented document and verifies a digital signature of the DID document for the presented document, in response to successful verification of the digital signature of the DID document for the presented document, requests verifiable credentials of the presented document and cryptographically validates the verifiable credentials of the presented document, in response to successful validation of the verifiable credentials of the presented document, retrieves a document based on a resource locator extracted from the verifiable credentials of the presented document and compares a hash of the retrieved document with a hash extracted from the verifiable credentials of the presented document, and in response to the comparing indicating the hash of the retrieved document matches the hash extracted from the verifiable credentials, authenticating the scanned document.

In an embodiment, the processing circuitry, in operation, generates an error message indicating the scanned document is not authentic in response to any of: a failure of the verifying of the digital signatures of the requested DID documents for modifications associated with the extracted QR codes, a failure of the validation of the requested verifiable credentials of the modifications, a failure of the verification that the verifiable credentials of the modifications are associated with the common DID document, a failure of the verification of the digital signature of the DID document for the presented document, a failure of the validation of the verifiable credentials of the presented document, or a failure of the comparing indicating the hash of the retrieved document matches the hash extracted from the verifiable credentials.

In an embodiment, the scanned document is a form and the DID documents for modifications are associated with signatures applied to the form.

In an embodiment, the system includes a self-sovereign identity server communicatively coupled to the processing circuity. The processing circuitry, in operation, transmits the requests for DID documents for modifications associated with the extracted QR codes to the self-sovereign identity server, transmits the requests for verifiable credentials of the modifications to the self-sovereign identity server, transmits the request for the DID document for the presented document to the self-sovereign identity server, and transmits the request for verifiable credentials of the presented document to the self-sovereign identity server.

In an embodiment, the system includes a document management server communicatively coupled to the processing circuitry. The processing circuitry, in operation, retrieves the document associated with the resource locator extracted from the verifiable credentials of the presented document from the document management server.

In an embodiment, a non-transitory computer-readable medium's contents configure a computing system to perform a method. The method includes extracting quick response (QR) codes from a presented document, requesting DID documents for modifications associated with the extracted QR codes, verifying digital signatures of the requested DID documents for modifications associated with the extracted QR codes, in response to successful verification of the digital signatures of the requested DID documents for modifications, requesting verifiable credentials of the modifications, and cryptographically validating the requested verifiable credentials of the modifications, in response to successful validation of the requested verifiable credentials of the modifications, verifying the verifiable credentials of the modifications are associated with a common DID document, in response to successful verification the verifiable credentials of the modifications are associated with the common DID document, requesting a DID document for the presented document and verifying a digital signature of the DID document for the presented document, in response to successful verification of the digital signature of the DID document for the presented document, requesting verifiable credentials of the presented document and cryptographically validating the verifiable credentials of the presented document, in response to successful validation of the verifiable credentials of the presented document, retrieving a document based on a resource locator extracted from the verifiable credentials of the presented document and comparing a hash of the retrieved document with a hash extracted from the verifiable credentials of the presented document, and in response to the comparing indicating the hash of the retrieved document matches the hash extracted from the verifiable credentials, authenticating the presented document.

In an embodiment, the method includes generating an error message indicating the presented document is not authentic in response to any of: a failure of the verifying of the digital signatures of the requested DID documents for modifications associated with the extracted QR codes; a failure of the validation of the requested verifiable credentials of the modifications; a failure of the verification that the verifiable credentials of the modifications are associated with the common DID document; a failure of the verification of the digital signature of the DID document for the presented document; a failure of the validation of the verifiable credentials of the presented document; or a failure of the comparing indicating the hash of the retrieved document matches the hash extracted from the verifiable credentials.

In an embodiment, the presented document is a form and the DID documents for modifications are associated with signatures applied to the form. In an embodiment, the method comprises: creating a record including an original document and a modification to the original document; generating metadata associated with the modification to the original document; storing the modification in a data store; requesting creation and registration of a decentralized identifier (DID) document for the modification based on the generated metadata; generating modified document metadata including a document hash and the created DID document for the modification; requesting recordation of the modification in a blockchain transaction, creation and registration of a DID document for the modified document, and generation of verifiable credentials for the modification; storing the generated verifiable credentials for the modification; generating a quick response (QR) code for the DID document for the modification; and adding a visual representation of the modification and the QR code for the modification to the original document, generating a sealed document. In an embodiment, the method comprising presenting the sealed document for authentication.

In an embodiment, a device comprises memory, and processing circuitry coupled to the memory. The processing circuitry, in operation, responds to requests from a client application. In response to a request to create and record a decentralized identifier (DID) document associated with a modification to an original document, the responding includes creating a DID document for the modification, requesting registration of the DID document for the modification in a distributed file system, and providing the DID document for the modification to the client application. In response to a request to record the modification to the document, the responding includes initiating a blockchain transaction to record the modification to the document, creating a DID document for the modified document, requesting registration of the DID document for the modified document in the distributed file system, generating verifiable credentials for the DID document for the modification, and providing the verifiable credentials for the DID document for the modification to the client application.

In an embodiment, the processing circuitry, in operation, provides the DID document for the modified document to the client application with the verifiable credentials for the DID document for the modification.

In an embodiment, the processing circuitry, in operation, responds to a request, from the client application, for a DID document by: retrieving the requested DID document from a distributed file system, and providing the requested DID document to the client application. In an embodiment, the processing circuitry, in operation, responds to a request, from the client application, for verifiable credentials for a DID document by: retrieving the verifiable credentials for the DID document from a secure data store, and providing the requested verifiable credentials to the client application.

In an embodiment, the original document is a form and the DID document for the modification is associated with a signature to be applied to the form. In an embodiment, the request to record the modification to the document is a request to record a plurality of modifications to the document, the initiated blockchain transaction records the plurality of modifications to the document, the generating verifiable credentials includes generating verifiable credentials for DID documents for each of the plurality of modifications, and the response to the request to record the plurality of modifications includes providing, to the client application, the DID document for the modified document, the DID documents for each of the plurality of modifications, and the verifiable credentials for the DID documents for each of the plurality of modifications. In an embodiment, each of the plurality of modifications corresponds to the application of a signature to the document.

In an embodiment, a method includes responding to a request, from a client application, to create and record a decentralized identifier (DID) document associated with a modification to an original document by: creating a DID document for the modification; requesting registration of the DID document for the modification in a distributed file system; and providing the DID document for the modification to the client application. The method includes responding to a request, from the client application, to record the modification to the document by: initiating a blockchain transaction to record the modification to the document; creating a DID document for the modified document; requesting registration of the DID document for the modified document in the distributed file system; generating verifiable credentials for the DID document for the modification; and providing the verifiable credentials for the DID document for the modification to the client application.

In an embodiment, the method includes providing the DID document for the modified document to the client application with the verifiable credentials for the DID document for the modification. In an embodiment, the method includes responding to a request, from the client application, for a DID document by: retrieving the requested DID document from a distributed file system; and providing the requested DID document to the client application. In an embodiment, the method includes responding to a request, from the client application, for verifiable credentials for a DID document by: retrieving the verifiable credentials for the DID document from a secure data store; and providing the requested verifiable credentials to the client application.

In an embodiment, the request to record the modification to the document is a request to record a plurality of modifications to the document; the initiated blockchain transaction records the plurality of modifications to the document; the generating verifiable credentials includes generating verifiable credentials for DID documents for each of the plurality of modifications; and the response to the request to record the plurality of modifications includes providing, to the client application, the DID document for the modified document, the DID documents for each of the plurality of modifications, and the verifiable credentials for the DID documents for each of the plurality of modifications.

In an embodiment, a system comprises a client device, which, in operation, executes client applications, and a document server, communicatively coupled to the client device. The document server, in operation, responds to a request, from a client application executing on the client device, to create and record a decentralized identifier (DID) document associated with a modification to an original document by: creating a DID document for the modification; requesting registration of the DID document for the modification in a distributed file system; and providing the DID document for the modification to the client application. The document server, in operation, responds to a request, from the client application, to record the modification to the document by: initiating a blockchain transaction to record the modification to the document; creating a DID document for the modified document; requesting registration of the DID document for the modified document in the distributed file system; generating verifiable credentials for the DID document for the modification; and providing the verifiable credentials for the DID document for the modification to the client application.

In an embodiment, the document server, in operation, provides the DID document for the modified document to the client application with the verifiable credentials for the DID document for the modification.

In an embodiment, the document server, in operation, responds to a request, from the client application, for a DID document by: retrieving the requested DID document from a distributed file system; and providing the requested DID document to the client application. In an embodiment, the document server, in operation, responds to a request, from the client application, for verifiable credentials for a DID document by: retrieving the verifiable credentials for the DID document from a secure data store; and providing the requested verifiable credentials to the client application.

In an embodiment, a non-transitory computer-readable medium' contents configure a processing system to perform a method. The method includes responding to a request, from a client application, to create and record a decentralized identifier (DID) document associated with a modification to an original document by: creating a DID document for the modification; requesting registration of the DID document for the modification in a distributed file system; and providing the DID document for the modification to the client application. In an embodiment, the method includes responding to a request, from the client application, to record the modification to the document by: initiating a blockchain transaction to record the modification to the document; creating a DID document for the modified document; requesting registration of the DID document for the modified document in the distributed file system; generating verifiable credentials for the DID document for the modification; and providing the verifiable credentials for the DID document for the modification to the client application. In an embodiment, the contents comprise instructions executed by the computing system.

In an embodiment, the method includes responding to a request, from the client application, for a DID document by: retrieving the requested DID document from a distributed file system; and providing the requested DID document to the client application. In an embodiment, the method includes responding to a request, from the client application, for verifiable credentials for a DID document by: retrieving the verifiable credentials for the DID document from a secure data store; and providing the requested verifiable credentials to the client application.

In an embodiment, a device comprises memory and processing circuitry coupled to the memory. The processing circuitry, in operation: extracts quick response (QR) codes from a presented document; transmits requests for decentralized identifier (DID) documents for modifications associated with the extracted QR codes, wherein the requested DID documents are electronic documents; receives the requested DID documents and verifies digital signatures of the received DID documents for modifications associated with the extracted QR codes; in response to successful verification of the digital signatures of the requested DID documents for modifications, transmits requests for verifiable credentials of the modifications, receives the verifiable credentials of the modifications, and cryptographically validates the received verifiable credentials of the modifications; in response to successful validation of the received verifiable credentials of the modifications, verifies the received verifiable credentials of the modifications are associated with a common DID document, wherein the common DID document is an electronic document; in response to successful verification the verifiable credentials of the modifications are associated with the common DID document, transmits a request for a DID document for the presented document, receives the requested DID document for the presented document, and verifies a digital signature of the DID document for the presented document; in response to successful verification of the digital signature of the DID document for the presented document, transmits a request for verifiable credentials of the presented document, receives the verifiable credentials of the presented document, and cryptographically validates the verifiable credentials of the presented document; in response to successful validation of the verifiable credentials of the presented document, transmits a request to retrieve a document based on a resource locator extracted from the verifiable credentials of the presented document, receives a retrieved document in response to the request, and compares a hash of the retrieved document with a hash extracted from the verifiable credentials of the presented document; and in response to the comparing indicating the hash of the retrieved document matches the hash extracted from the verifiable credentials, authenticates the presented document, the authenticating including generating a message indicating the presented document is authentic.

In an embodiment, the processing circuitry, in operation, generates an error message indicating the presented document is not authentic in response to any of: a failure of the verifying of the digital signatures of the requested DID documents for modifications associated with the extracted QR codes; a failure of the validation of the requested verifiable credentials of the modifications; a failure of the verification that the verifiable credentials of the modifications are associated with the common DID document; a failure of the verification of the digital signature of the DID document for the presented document; a failure of the validation of the verifiable credentials of the presented document; or a failure of the comparing indicating the hash of the retrieved document matches the hash extracted from the verifiable credentials.

In an embodiment, the device comprises a document scanner coupled to the processing circuitry, wherein the document scanner, in operation, scans the presented document.

In an embodiment, the presented document is a form and the DID documents for modifications are associated with signatures applied to the form. In an embodiment, the form is a treatment form including a provider signature associated with a first QR code and a patient signature associated with a second QR code.

In an embodiment, the processing circuitry, in operation: transmits the requests for DID documents for modifications associated with the extracted QR codes to a self-sovereign identity server; transmits the requests for verifiable credentials of the modifications to the self-sovereign identity server; transmits the request for the DID document for the presented document to the self-sovereign identity server; and transmits the request for verifiable credentials of the presented document to the self-sovereign identity server. In an embodiment, the processing circuitry, in operation, transmits the request to retrieve the document associated with the resource locator extracted from the verifiable credentials of the presented document to a document management server.

In an embodiment, the processing circuitry, in operation: creates a record including an original document and a modification to the original document; generates metadata associated with the modification to the original document; stores the modification in a data store; transmits a request for creation and registration of a decentralized identifier (DID) document for the modification based on the generated metadata; receives the created DID document for the modification and generates modified document metadata including a document hash and the created DID document for the modification; transmits a request for recordation of the modification in a blockchain transaction, creation and registration of a DID document for the modified document, and generation of verifiable credentials for the modification; stores the generated verifiable credentials for the modification; generates a quick response (QR) code for the DID document for the modification; and adds a visual representation of the modification and the QR code for the modification to the original document, generating a sealed document. In an embodiment, the sealed document is the presented document.

In an embodiment, a method is performed by a processing device. The method comprises: extracting quick response (QR) codes from a presented document; transmitting requests for decentralized identifier (DID) documents for modifications associated with the extracted QR codes, wherein the requested DID documents are electronic documents; receiving the requested DID documents and verifying digital signatures of the received DID documents for modifications associated with the extracted QR codes; in response to successful verification of the digital signatures of the requested DID documents for modifications, transmitting requests for verifiable credentials of the modifications, receiving the verifiable credentials of the modifications, and cryptographically validating the received verifiable credentials of the modifications; in response to successful validation of the received verifiable credentials of the modifications, verifying the received verifiable credentials of the modifications are associated with a common DID document, wherein the common DID document is an electronic document; in response to successful verification the verifiable credentials of the modifications are associated with the common DID document, transmitting a request for a DID document for the presented document, receiving the requested DID document for the presented document, and verifying a digital signature of the DID document for the presented document; in response to successful verification of the digital signature of the DID document for the presented document, transmitting a request for verifiable credentials of the presented document, receiving the verifiable credentials of the presented document, and cryptographically validating the verifiable credentials of the presented document; in response to successful validation of the verifiable credentials of the presented document, transmitting a request to retrieve a document based on a resource locator extracted from the verifiable credentials of the presented document, receiving a retrieved document in response to the request, and comparing a hash of the retrieved document with a hash extracted from the verifiable credentials of the presented document; and in response to the comparing indicating the hash of the retrieved document matches the hash extracted from the verifiable credentials, authenticating the presented document, the authenticating including generating a message indicating the presented document is authentic.

In an embodiment, the method comprises generating an error message indicating the presented document is not authentic in response to any of: a failure of the verifying of the digital signatures of the requested DID documents for modifications associated with the extracted QR codes; a failure of the validation of the requested verifiable credentials of the modifications; a failure of the verification that the verifiable credentials of the modifications are associated with the common DID document; a failure of the verification of the digital signature of the DID document for the presented document; a failure of the validation of the verifiable credentials of the presented document; or a failure of the comparing indicating the hash of the retrieved document matches the hash extracted from the verifiable credentials. In an embodiment, the method comprises scanning the presented document.

In an embodiment, the presented document is a form and the DID documents for modifications are associated with signatures applied to the form. In an embodiment, the form is a treatment form including a provider signature associated with a first QR code and a patient signature associated with a second QR code.

In an embodiment, the method comprises: transmitting the requests for DID documents for modifications associated with the extracted QR codes to a self-sovereign identity server; transmitting the requests for verifiable credentials of the modifications to the self-sovereign identity server; transmitting the request for the DID document for the presented document to the self-sovereign identity server; and transmitting the request for verifiable credentials of the presented document to the self-sovereign identity server. In an embodiment, the method comprises transmitting the request to retrieve the document associated with the resource locator extracted from the verifiable credentials of the presented document to a document management server.

In an embodiment, the method comprises: creating a record including an original document and a modification to the original document; generating metadata associated with the modification to the original document; storing the modification in a data store; requesting creation and registration of a decentralized identifier (DID) document for the modification based on the generated metadata; generating modified document metadata including a document hash and the created DID document for the modification; requesting recordation of the modification in a blockchain transaction, creation and registration of a DID document for the modified document, and generation of verifiable credentials for the modification; storing the generated verifiable credentials for the modification; generating a quick response (QR) code for the DID document for the modification; and adding a visual representation of the modification and the QR code for the modification to the original document, generating a sealed document. In an embodiment, the method comprises presenting the sealed document for authentication.

In an embodiment, a system, comprises a document scanner, which, in operation, scans documents, and processing circuitry coupled to the document scanner. The processing circuitry, in operation: extracts quick response (QR) codes from a scanned document; transmits requests for decentralized identifier (DID) documents for modifications associated with the extracted QR codes, wherein the requested DID documents are electronic documents; receives the requested DID documents and verifies digital signatures of the requested DID documents for modifications associated with the extracted QR codes; in response to successful verification of the digital signatures of the requested DID documents for modifications, transmits requests for verifiable credentials of the modifications, receives the verifiable credentials of the modifications, and cryptographically validates the received verifiable credentials of the modifications; in response to successful validation of the received verifiable credentials of the modifications, verifies the received verifiable credentials of the modifications are associated with a common DID document, wherein the common DID document is an electronic document; in response to successful verification the verifiable credentials of the modifications are associated with the common DID document, transmits a request for a DID document for the presented document, receives the requested DID document for the presented document, and verifies a digital signature of the DID document for the presented document; in response to successful verification of the digital signature of the DID document for the presented document, transmits a request for verifiable credentials of the presented document, receives the verifiable credentials of the presented document, and cryptographically validates the verifiable credentials of the presented document; in response to successful validation of the verifiable credentials of the presented document, transmits a request to retrieve a document based on a resource locator extracted from the verifiable credentials of the presented document, receives a retrieved document in response to the request, and compares a hash of the retrieved document with a hash extracted from the verifiable credentials of the presented document; and in response to the comparing indicating the hash of the retrieved document matches the hash extracted from the verifiable credentials, authenticating the scanned document, the authenticating including generating a message indicating the scanned document is authentic.

In an embodiment, the processing circuitry, in operation, generates an error message indicating the scanned document is not authentic in response to any of: a failure of the verifying of the digital signatures of the requested DID documents for modifications associated with the extracted QR codes; a failure of the validation of the requested verifiable credentials of the modifications; a failure of the verification that the verifiable credentials of the modifications are associated with the common DID document; a failure of the verification of the digital signature of the DID document for the presented document; a failure of the validation of the verifiable credentials of the presented document; or a failure of the comparing indicating the hash of the retrieved document matches the hash extracted from the verifiable credentials. In an embodiment, the scanned document is a form and the DID documents for modifications are associated with signatures applied to the form.

In an embodiment, the system comprises: a self-sovereign identity server communicatively coupled to the processing circuitry, wherein the processing circuitry, in operation, transmits the requests for DID documents for modifications associated with the extracted QR codes to the self-sovereign identity server; transmits the requests for verifiable credentials of the modifications to the self-sovereign identity server; transmits the request for the DID document for the presented document to the self-sovereign identity server; and transmits the request for verifiable credentials of the presented document to the self-sovereign identity server.

In an embodiment, the system comprises a document management server communicatively coupled to the processing circuitry, wherein the processing circuitry, in operation, transmits the request to retrieve the document associated with the resource locator extracted from the verifiable credentials of the presented document to the document management server.

In an embodiment, the processing circuitry, in operation: creates a record including an original document and a modification to the original document; generates metadata associated with the modification to the original document; stores the modification in a data store; transmits a request for creation and registration of a decentralized identifier (DID) document for the modification based on the generated metadata; receives the created DID document for the modification and generates modified document metadata including a document hash and the created DID document for the modification; transmits a request for recordation of the modification in a blockchain transaction, creation and registration of a DID document for the modified document, and generation of verifiable credentials for the modification; stores the generated verifiable credentials for the modification; generates a quick response (QR) code for the DID document for the modification; and adds a visual representation of the modification and the QR code for the modification to the original document, generating a sealed document. In an embodiment, the sealed document is the scanned document.

In an embodiment, a non-transitory computer-readable medium's contents configure a computing system to perform a method. The method comprises: extracting quick response (QR) codes from a presented document; transmitting requests for decentralized identifier (DID) documents for modifications associated with the extracted QR codes, wherein the requested DID documents are electronic documents; receiving the requested DID documents and verifying digital signatures of the requested DID documents for modifications associated with the extracted QR codes; in response to successful verification of the digital signatures of the requested DID documents for modifications, transmitting requests for verifiable credentials of the modifications, receiving the verifiable credentials of the modifications, and cryptographically validating the received verifiable credentials of the modifications; in response to successful validation of the received verifiable credentials of the modifications, verifying the verifiable credentials of the modifications are associated with a common DID document, wherein the common DID document is an electronic document; in response to successful verification the verifiable credentials of the modifications are associated with the common DID document, transmitting a request for a DID document for the presented document, receiving the requested DID document for the presented document, and verifying a digital signature of the DID document for the presented document; in response to successful verification of the digital signature of the DID document for the presented document, transmitting a request for verifiable credentials of the presented document, receiving the verifiable credentials of the presented document, and cryptographically validating the verifiable credentials of the presented document; in response to successful validation of the verifiable credentials of the presented document, transmitting a request to retrieve a document based on a resource locator extracted from the verifiable credentials of the presented document, receiving a retrieved document in response to the request, and comparing a hash of the retrieved document with a hash extracted from the verifiable credentials of the presented document; and in response to the comparing indicating the hash of the retrieved document matches the hash extracted from the verifiable credentials, authenticating the presented document, the authenticating including generating a message indicating the presented document is authentic. In an embodiment, the method comprises generating an error message indicating the presented document is not authentic in response to any of: a failure of the verifying of the digital signatures of the requested DID documents for modifications associated with the extracted QR codes; a failure of the validation of the requested verifiable credentials of the modifications; a failure of the verification that the verifiable credentials of the modifications are associated with the common DID document; a failure of the verification of the digital signature of the DID document for the presented document; a failure of the validation of the verifiable credentials of the presented document; or a failure of the comparing indicating the hash of the retrieved document matches the hash extracted from the verifiable credentials. In an embodiment, the presented document is a form and the DID documents for modifications are associated with signatures applied to the form.

In an embodiment, the method comprises: creating a record including an original document and a modification to the original document; generating metadata associated with the modification to the original document; storing the modification in a data store; requesting creation and registration of a decentralized identifier (DID) document for the modification based on the generated metadata; generating modified document metadata including a document hash and the created DID document for the modification; requesting recordation of the modification in a blockchain transaction, creation and registration of a DID document for the modified document, and generation of verifiable credentials for the modification; storing the generated verifiable credentials for the modification; generating a quick response (QR) code for the DID document for the modification; and adding a visual representation of the modification and the QR code for the modification to the original document, generating a sealed document. In an embodiment, the method comprises presenting the sealed document for authentication.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
  memory; and
  processing circuitry coupled to the memory, wherein the processing circuitry, in operation:
    creates a record including an original document and a modification to the original document;
    generates metadata associated with the modification to the original document;
    stores the generated metadata associated with the modification to the original document in a record of a forensic signature store;

requests, via a self-sovereign identity (SSI) interface, creation and registration of a decentralized identifier (DID) document for the modification based on the generated metadata;

receives, via the SSI interface, the created DID document for the modification;

generates modified document metadata including a document hash and the created DID document for the modification;

requests, via the SSI interface, recordation of the modification in a blockchain transaction, creation and registration of a DID document for the modified document, and generation of verifiable credentials for the modification;

receives, via the SSI interface, the generated verifiable credentials for the modification;

stores the generated verifiable credentials for the modification in a verifiable credentials store;

generates a quick response (QR) code for the DID document for the modification, wherein the QR code provides a cryptographic link between the modification and the DID document; and adds a visual representation of the modification and the QR code for the modification to the original document, generating a sealed document, wherein the documents are electronic documents.

2. The device of claim 1, comprising:

a signature capture device coupled to the processing circuitry and the memory, wherein the modification includes application of a digital signature captured by the signature capture device to the original document.

3. The device of claim 2, wherein the processing circuitry, in operation:

prior to creating the record, verifies, using a signature validation engine, an authenticity of the captured signature; and responds to a failure of the verifying of the authenticity of the captured signature by generating an error message.

4. The device of claim 3, wherein the original document is a form authorizing an activity and the processing circuitry, in operation:

prior to creating the record, verifies an identity associated with the captured signature is authorized to authorize the activity; and responds to a failure of the verifying of the identity by generating an error message.

5. The device of claim 2, wherein the record includes a second modification including application of a second signature to the original document.

6. The device of claim 2, wherein the adding the visual representation comprises adding a signature block including the captured digital signature and the QR code for the DID document for the modification.

7. The device of claim 1, comprising:

a signature capture device coupled to the processing circuitry and the memory, wherein the original document is a treatment form, the modification is a first modification applying a provider signature captured by the signature capture device to the original document, and the record includes a second modification applying a patient signature captured by the signature capture device to the original document.

8. The device of claim 1, wherein the processing circuitry, in operation, transmits the request for creation and registration of a decentralized identifier (DID) document for the modification to a self-sovereign identity server via the SSI interface; and transmits the request for recordation of the modification in a blockchain transaction, creation and registration of a DID document for the document, and generation of verifiable credentials for the modification to the self-sovereign identity server via the SSI interface.

9. The device of claim 1, wherein the generated modified document metadata includes a document hash of the original document.

10. The device of claim 1, wherein the generated modified document metadata includes a document hash of the original document and a document hash of the modified document.

11. A system, comprising:

a client device including a first memory and first processing circuitry coupled to the first memory;

a self-sovereign identity (SSI) device including a second memory and second processing circuitry coupled to the second memory; and a SSI interface coupled between the client device and the SSI device, wherein the first processing circuitry, in operation, creates a record including an original document and a modification to the original document;

generates metadata associated with the modification to the original document;

stores the generated metadata associated with the modification to the original document in a record of a forensic signature store;

requests, via the SSI interface, creation and registration of a decentralized identifier (DID) document for the modification based on the generated metadata;

receives, via the SSI interface, the created DID document for the modification;

generates modified document metadata including a document hash and the created DID document for the modification;

requests, via the SSI interface, recordation of the modification in a blockchain transaction, creation and registration of a DID document for the modified document, and generation of verifiable credentials for the modification;

receives, via the SSI interface, the generated verifiable credentials for the modification;

stores the generated verifiable credentials for the modification in a verifiable credentials store;

generates a quick response (QR) code for the DID document for the modification, wherein the QR code provides a cryptographic link between the modification and the DID document; and adds a visual representation of the modification and the QR code for the modification to the original document, generating a sealed document, wherein the documents are electronic documents, and the second processing circuitry, in operation:

responds to the request, received via the SSI interface from a client application executing on the client device, to create and record a decentralized identifier (DID) document associated with a modification to an original document by:

creating a DID document for the modification;

requesting registration of the DID document for the modification in a distributed file system; and providing the DID document for the modification to the client application via the SSI interface; and responds to the request, received from the client application via the SSI interface, to record the modification to the document by:
    initiating a blockchain transaction to record the modification to the document;
    creating a DID document for the modified document;
    requesting registration of the DID document for the modified document in the distributed file system;
    generating verifiable credentials for the DID document for the modification; and
    providing the verifiable credentials for the DID document for the modification to the client application via the SSI interface.

12. The system of claim 11, wherein the second processing circuitry, in operation, provides the DID document for the modified document to the client application with the verifiable credentials for the DID document for the modification.

13. The system of claim 11 wherein the second processing circuitry, in operation,
    responds to a request, from the client application, for a DID document by:
        retrieving the requested DID document from a distributed file system; and
        providing the requested DID document to the client application; and
    responds to a request, from the client application, for verifiable credentials for a DID document by:
        retrieving the verifiable credentials for the DID document from a secure data store; and
        providing the requested verifiable credentials to the client application.

14. The system of claim 11, wherein the original document is a form and the DID document for the modification is associated with a signature to be applied to the form.

15. The system of claim 11, wherein,
    the request to record the modification to the document is a request to record a plurality of modifications to the document;
    the initiated blockchain transaction records the plurality of modifications to the document;
    the generating verifiable credentials includes generating verifiable credentials for DID documents for each of the plurality of modifications; and
    the response to the request to record the plurality of modifications includes providing, to the client application, the DID document for the modified document, the DID documents for each of the plurality of modifications, and the verifiable credentials for the DID documents for each of the plurality of modifications.

16. The system of claim 15, wherein each of the plurality of modifications corresponds to the application of a signature to the document.

* * * * *